US012359907B2

United States Patent
Ravi

(10) Patent No.: US 12,359,907 B2
(45) Date of Patent: Jul. 15, 2025

(54) INTERFEROMETER FILTERS WITH PARTIAL COMPENSATION STRUCTURE

(71) Applicant: Psiquantum, Corp., Palo Alto, CA (US)

(72) Inventor: Koustuban Ravi, Oakland, CA (US)

(73) Assignee: Psiquantum, Corp., Palo Alto, CA (US)

( * ) Notice: Subject to any disclaimer, the term of this patent is extended or adjusted under 35 U.S.C. 154(b) by 225 days.

(21) Appl. No.: 18/204,181

(22) Filed: May 31, 2023

(65) Prior Publication Data

US 2024/0027179 A1 Jan. 25, 2024

Related U.S. Application Data

(63) Continuation of application No. 17/538,926, filed on Nov. 30, 2021, now Pat. No. 11,703,316.

(51) Int. Cl.
  *G01B 9/02* (2022.01)
  *G02B 6/12* (2006.01)
  *G02B 6/293* (2006.01)

(52) U.S. Cl.
  CPC ....... *G01B 9/02049* (2013.01); *G02B 6/2935* (2013.01); *G02B 2006/12159* (2013.01)

(58) Field of Classification Search
  CPC .............. G01B 9/02049; G02B 6/1228; G02B 6/2935; G02B 6/29355; G02B 2006/12159
  See application file for complete search history.

(56) References Cited

U.S. PATENT DOCUMENTS

| 8,131,120 | B2 | 3/2012 | Doerr |
| 10,534,130 | B1 | 1/2020 | Ravi et al. |
| 10,935,726 | B1 | 3/2021 | Lee et al. |
| 11,048,041 | B2 | 6/2021 | Ravi et al. |
| 11,543,587 | B2 | 1/2023 | Ravi et al. |

(Continued)

OTHER PUBLICATIONS

U.S. Appl. No. 17/538,926, "Notice of Allowance", Feb. 28, 2023, 9 pages.

(Continued)

*Primary Examiner* — Michael A Lyons
(74) *Attorney, Agent, or Firm* — Kilpatrick Townsend & Stockton LLP

(57) ABSTRACT

A Mach-Zehnder interferometer (MZI) filter comprising one or more passive compensation structures are described. The passive compensation structures yield MZI filters that are intrinsically tolerant to perturbations in waveguide dimensions and/or other ambient conditions. The use of n+1 waveguide widths can mitigate n different sources of perturbation to the filter. The use of at least three different waveguide widths for each Mach-Zehnder waveguide can alleviate sensitivity of filter performance to random width or temperature variations. A tolerance compensation portion is positioned between a first coupler section and a second coupler section, wherein the tolerance compensation portion includes a first compensation section having a second width, a second compensation section having a third width and a third compensation section having a fourth width, wherein the fourth width is greater than the third width and the third width is greater than the second width.

20 Claims, 27 Drawing Sheets

(56) References Cited

U.S. PATENT DOCUMENTS

| | | | |
|---|---|---|---|
| 11,703,316 B2* | 7/2023 | Ravi | G02B 6/2935 |
| | | | 356/477 |
| 2011/0150388 A1 | 6/2011 | Shin et al. | |
| 2012/0063716 A1 | 3/2012 | Mizuno et al. | |
| 2020/0371287 A1 | 11/2020 | Ravi et al. | |
| 2021/0201126 A1 | 7/2021 | Meng et al. | |

OTHER PUBLICATIONS

PCT/US2022/051212, "International Search Report and the Written Opinion", Mar. 10, 2023, 9 pages.
PCT/US2022/051212, "International Preliminary Report on Patentability", Jun. 13, 2024, 8 pages.

* cited by examiner

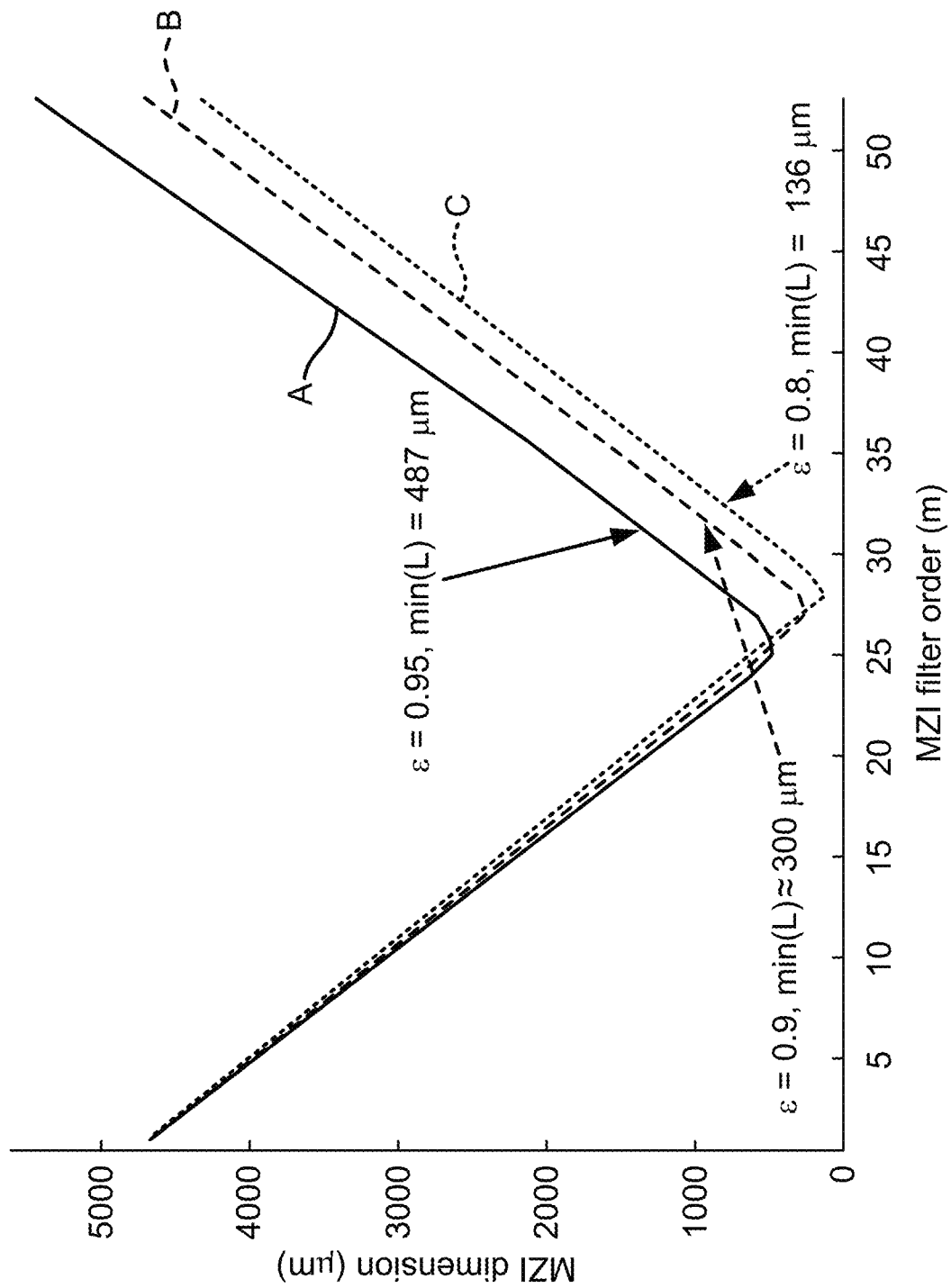

INTERFEROMETER FILTERS WITH PARTIAL COMPENSATION STRUCTURE

CROSS-REFERENCES TO RELATED APPLICATIONS

This application is a continuation of U.S. patent application Ser. No. 17/538,926, filed on Nov. 30, 2021, now U.S. Pat. No. 11,703,316, issued on Jul. 18, 2023, the disclosure of which is hereby incorporated by reference in its entirety for all purposes.

BACKGROUND OF THE INVENTION

Currently, there are a wide variety of devices that utilize optical circuits for communications and/or computations. Many optical circuits rely on one or more optical filter elements to filter out undesirable optical frequencies, so an optical frequency range of interest can be isolated.

In some applications, an MZI filter which can include a cascaded MZI filter, may demonstrate the theoretical capability of meeting the system specifications. However, when practical fabrication tolerances of the MZI filter are accounted for, the MZI filter may not be able to meet the system specifications without additional tuning. More specifically, an MZI filter employs two parallel waveguides and fabrication variations in the dimensions of the waveguides can produce undesirable shifts in the frequency response of the filter. This can lead to decreased performance parameters of the filter and/or, the failure to meet specifications and unacceptably high yield loss.

To compensate for fabrication variations some applications employ one or more heaters that are used to actively tune the filters using the thermo-optic effect in silicon/silicon nitride. However, the use of heaters increases power consumption of the circuit and may not be optimal for circuits that operate at cryogenic temperatures. Active tuning as a post-fabrication process is another common approach to mitigating fabrication variation, however active tuning can increase expense, may be dependent on foundry-specific processes, and could be intractable for circuits with numerous filters. Therefore, passive compensation structures for MZI filters that are intrinsically tolerant to perturbations from variations in waveguide dimensions and/or other ambient conditions are desired.

SUMMARY OF THE INVENTION

The described embodiments relate generally to optical filter devices. More particularly, the present embodiments relate to Mach-Zehnder interferometer (MZI) filters that include one or more compensation structures to compensate for variations in manufacturing tolerances and/or temperature variations and/or other perturbations.

In some embodiments, a Mach-Zehnder interferometer (MZI) filter comprises a first waveguide having a first length and extending from a first coupler section to a second coupler section, the first waveguide having a constant first width along the first length. A second waveguide having a second length and extending from the first coupler section to the second coupler section includes a tolerance compensation portion positioned between the first coupler section and the second coupler section. The tolerance compensation portion includes a first compensation section having a second width, a second compensation section having a third width and a third compensation section having a fourth width, wherein the fourth width is greater than the third width and the third width is greater than the second width. A first taper portion is positioned between the first coupler section and the first compensation section and transitions from the first coupler section to the second width. A second taper portion is positioned between the first compensation section and the second compensation section and transitions from the second width to the third width. A third taper portion is positioned between the second compensation section and the third compensation section and transitions from the third width to the fourth width.

In some embodiments, the first compensation section has a constant second width, the second compensation section has a constant third width and the third compensation section has a constant fourth width. In various embodiments, the tolerance compensation portion is symmetric and includes a fourth compensation section having the third width and a fifth compensation section having the second width. In some embodiments, the tolerance compensation portion in the second waveguide is a first tolerance compensation portion and the first waveguide includes a second tolerance compensation portion that includes a fourth compensation section having a fifth width, wherein the fifth width is greater than the first width.

In some embodiments, the first waveguide and the tolerance compensation portion form components of a tolerance compensation structure that compensates for a variation in a width of the first waveguide and a variation in a width of the second waveguide due to manufacturing tolerances. In various embodiments, the tolerance compensation structure reduces a shift in a frequency response of the MZI filter due to the variation in the width of the first waveguide and the variation in the width of the second waveguide.

In some embodiments, a method of fabricating a Mach-Zehnder interferometer (MZI) filter tolerant to manufacturing variations comprises forming a substrate and forming a first waveguide on the substrate, the first waveguide having a first length and a first continuous width along the first length, wherein the first width varies within a first range, and forming a second waveguide on the substrate. The second waveguide includes a manufacturing tolerance compensation portion including a first compensation section having a continuous second width that varies in a second range, a second compensation section having a continuous third width that varies in a third range and a third compensation section having a continuous fourth width that varies in a fourth range, wherein the fourth width is greater than the third width and the third width is greater than the second width.

In some embodiments, a first taper portion is positioned between a first coupler section and the first compensation section and transitions from the first coupler section to the second width, and a second taper portion is positioned between the first compensation section and the second compensation section and transitions from the second width to the third width. A third taper portion is positioned between the second compensation section and the third compensation section and transitions from the third width to the fourth width.

In some embodiments, the tolerance compensation portion is symmetric and includes a fourth compensation section having the third width and a fifth compensation section having the second width. In various embodiments, the tolerance compensation portion in the second waveguide is a first tolerance compensation portion and the first waveguide includes a second tolerance compensation portion that includes a fourth compensation section having a fifth width, wherein the fifth width is greater than the first width.

In some embodiments, the manufacturing tolerance compensation portion reduces a shift in a frequency response of the MZI filter caused by the second width varying within the second range, the third width varying within the third range and the fourth width varying within the fourth range.

In some embodiments, a Mach-Zehnder interferometer (MZI) filter comprises a first waveguide having a first width extending between a first coupler section and a second coupler section, and a second waveguide extending between the first coupler section and the second coupler section and including a first compensation section having a second width, a second compensation section having a third width and a third compensation section having a fourth width, wherein the fourth width is greater than the third width and the third width is greater than the second width. In various embodiments, the MZI filter further comprises a first taper portion positioned between the first coupler section and the first compensation section and transitioning from the first coupler section to the second width. A second taper portion is positioned between the first compensation section and the second compensation section and transitions from the second width to the third width. A third taper portion is positioned between the second compensation section and the third compensation section and transitions from the third width to the fourth width.

In some embodiment, the second waveguide further includes a fourth compensation section having the third width and a fifth compensation section having the second width. In various embodiments, the second waveguide includes a fourth compensation section having the third width and a fifth compensation section having the second width.

In some embodiments, a method for making a Mach-Zehnder interferometer (MZI) filter having a compensation section that compensates for a number of perturbations comprises fabricating a first waveguide having a first length and one or more first compensation sections distributed along the first length, wherein each first compensation section of the one or more first compensation sections includes a respective width and length. The method further comprises fabricating a second waveguide having a second length and one or more second compensation sections distributed along the second length, wherein each second compensation section of the one or more second compensation sections includes a respective width and length. Wherein, a sum of the one or more first compensation sections and the one or more second compensation sections is greater than the number of perturbations.

In some embodiments, the number of perturbations is selected from a manufacturing tolerance variation in a width of each of the first and the second waveguides, a manufacturing tolerance variation in a thickness of each of the first and the second waveguides and a temperature variation in each of the first and the second waveguides.

In some embodiments, a method for making a Mach-Zehnder interferometer (MZI) filter comprises fabricating a first waveguide having a first length and a first continuous width, and fabricating a second waveguide having a second length and a plurality of widths along the second waveguide, wherein the first and the second waveguides simultaneously satisfy:

$$m\lambda_0 = L_1\left(n_1(\lambda_0) - \sum_i n_i(\lambda_0)\kappa_i\right)$$

$$v_{FSR} = \frac{c}{L_1\left(n_{g1} - \sum_i n_{gi}\kappa_i\right)}$$

$$\frac{\partial n_1}{\partial X_j} = \sum_i \kappa_i \frac{\partial n_i}{\partial X_j}$$

$$\frac{\partial^2 n_1}{\partial X_j \partial \omega} = \sum_i \kappa_i \frac{\partial^2 n_i}{\partial X_j \partial \omega}$$

$$\frac{\partial^2 n_1}{\partial X_j^2} = \sum_i \kappa_i \frac{\partial^2 n_i}{\partial X_j^2}$$

wherein:
m=an integral multiple;
$\lambda_0$=wavelength of light in first and second arms;
$L_1$=reference length of first arm;
$\lambda_0$=central wavelength of light in first and second arms;
$L_i$=length of $i^{th}$ portion of second arm;
$\kappa_i = L_i/L_1$;
$v_{FSR}$=free spectral range;
c=speed of light;
$X_1$=waveguide width; and
$X_2$=waveguide thickness.

In some embodiments, the second waveguide has a first compensation section having a second width, a second compensation section having a third width and a third compensation section having a fourth width, wherein the fourth width is greater than the third width and the third width is greater than the second width. In various embodiments the second waveguide further includes a first taper portion positioned between a first coupler section and the first compensation section and transitioning from the first coupler section to the second width. A second taper portion is positioned between the first compensation section and the second compensation section and transitions from the second width to the third width. A third taper portion is positioned between the second compensation section and the third compensation section and transitions from the third width to the fourth width.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 1F is a set of plots showing a magnified portion of the set of plots in FIG. 1E;

DETAILED DESCRIPTION OF SPECIFIC EMBODIMENTS

Figure 1A:
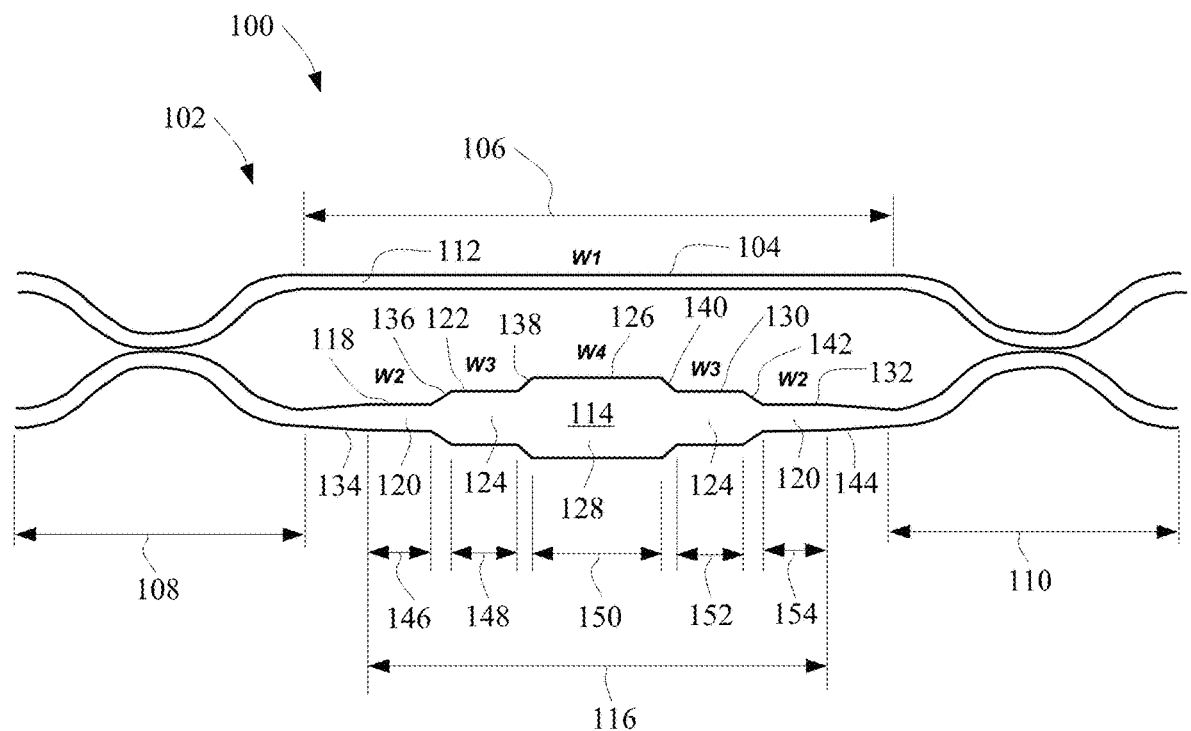
FIG. 1A illustrates a simplified plan view of an example Mach-Zehnder interferometer filter including a passive compensation structure, according to embodiments of the disclosure.

Some embodiments of the present disclosure relate to a passive compensation structure for a Mach-Zehnder interferometer (MZI) filter that improves the filter's ability to accommodate changes in manufacturing tolerances and/or other perturbations. While the present disclosure can be useful for a wide variety of configurations, some embodiments of the disclosure are particularly useful for cascaded MZI filters that are fabricated using silicon-based structures, as described in more detail below.

For example, in some embodiments, an MZI filter includes a pair of waveguides that extend between a first and a second coupler section. The first waveguide has a first continuous width along its length. The second waveguide includes a tolerance compensation portion positioned between the first and the second coupler sections. The tolerance compensation portion includes multiple waveguide sections, each having a different width, as explained in more detail below. The compensation portion can reduce a shift in frequency response of the MZI filter that can be caused by various perturbations, including variations in manufacturing widths of the waveguides, manufacturing variations in thicknesses of the waveguides and variations in temperature. In further embodiments the compensation structure can be designed to reduce a shift in frequency response of the MZI filter that can be caused by myriad perturbations while meeting a resonance requirement, as described in more detail below.

In one example the tolerance compensation portion includes waveguide sections having three different widths, however other embodiments may have a lesser number or a greater number of widths. In this example, the tolerance compensation portion includes a first compensation portion having a second width, a second compensation portion having a third width and a third compensation portion having a fourth width, wherein the fourth width is greater than the third width and the third width is greater than the second width.

In another example the first waveguide can also have a compensation portion including multiple waveguide sections, each having different waveguide widths. In further examples, the compensation structure can be designed to compensate for a particular number of system perturbations by having a quantity of waveguide widths that is greater than the number of perturbations. In one embodiment the resonance requirement and a number of system perturbations can be accommodated by designing the compensation structure to have at least one more waveguide width than the number of system perturbations. For example in one embodiment a MZI filter can be designed to have insensitivity to width variations and to have a resonance at 1.55 um by having a compensation structure with three different widths, while a compensation structure having two different widths may be used to compensate for width variations only. In further examples, the degree to which the compensation structure can compensate for a particular set of perturbations can be improved by increasing the total number of different waveguide widths, as also described below.

In some embodiments, lengths and widths of the compensation structure can be determined using one or more compensation equations. More specifically, the first and the second waveguides of the MZI filter simultaneously satisfy:

$$m\lambda_0 = L_1\left(n_1(\lambda_0) - \sum_i n_i(\lambda_0)\kappa_i\right)$$

$$v_{FSR} = \frac{c}{L_1\left(n_{g1} - \sum_i n_{gi}\kappa_i\right)}$$

$$\frac{\partial n_1}{\partial X_j} = \sum_i \kappa_i \frac{\partial n_i}{\partial X_j}$$

$$\frac{\partial^2 n_1}{\partial X_j \partial \omega} = \sum_i \kappa_i \frac{\partial^2 n_i}{\partial X_j \partial \omega}$$

$$\frac{\partial^2 n_1}{\partial X_j^2} = \sum_i \kappa_i \frac{\partial^2 n_i}{\partial X_j^2}$$

wherein:
m=an integral multiple;
$\lambda_0$=wavelength of light in first and second arms;
$L_1$=reference length of first arm;
$L_i$=length of $i^{th}$ portion of second arm;
$\kappa_i = L_i/L_1$;
$v_{FSR}$=free spectral range;
c=speed of light;
$X_1$=waveguide width; and
$X_2$=waveguide thickness.

In order to better appreciate the features and aspects of the present disclosure, further context for the disclosure is provided in the following section by discussing one particular implementation of an MZI filter that includes a passive compensation structure, according to embodiments of the disclosure. These embodiments are for explanatory purposes only and other embodiments may be employed in other MZI-based filter devices. In some instances, embodiments of the disclosure are particularly well suited for use with quantum computing circuits because of the intractability of using thermo-optic tuning for these applications.

FIG. 1A illustrates a simplified plan view of an example Mach-Zehnder interferometer filter 100 including a passive compensation structure 102, according to an embodiment of the disclosure. As shown in FIG. 1, MZI filter 100 includes a first waveguide 104 having a first length 106 and extending from a first coupler section 108 to a second coupler section 110. First waveguide 104 has a constant first width 112 along first length 106. A second waveguide 114 includes a compensation portion 116 positioned between first coupler section 108 and second coupler section 110. Compensation portion 116 includes a first compensation section 118 having a second width 120, a second compensation section 122 having a third width 124 and a third compensation section 126 having a fourth width 128. In some embodiments, fourth width 128 is greater than third width 124 and the third width is greater than second width 120. In some embodiments, the width and length of each compensation portion can be determined using one or more compensation equations, as described in more detail below.

In some embodiments, compensation portion 116 is symmetric along second waveguide 114 and further includes a fourth compensation section 130 having third width 124 and a fifth compensation section 132 having second width 120. In further embodiments, compensation structure 102 may also include a compensation portion positioned within first waveguide 104, as described in more detail below.

In various embodiments, one or more taper portions can be positioned in-between each compensation section to transition between different waveguide widths. More specifically, in some embodiments, a first taper portion 134 is positioned between first coupler section 108 and first compensation section 118 and transitions to second width 120. A second taper portion 136 can be positioned between first compensation section 118 and second compensation section 122 and transitions from second width 120 to third width 124. A third taper portion 138 can be positioned between second compensation section 122 and third compensation section 126 and transitions from third width 124 to fourth width 128. Similarly, a fourth taper portion 140 can be positioned between third compensation section 126 and fourth compensation section 130 and transitions from fourth width 128 to third width 124. A fifth taper portion 142 can be positioned between fourth compensation section 130 and fifth compensation section 132 and transitions between third width 124 and second width 120. A sixth taper portion 144 can be positioned between fifth compensation section 132 and second coupler section 110 and can transition from second waveguide width 120. In some embodiments, first waveguide 104 can also include one or more taper portions to transition widths between first coupler section 108 to first waveguide 104 and from the first waveguide to second coupler section 110.

In some embodiments, each compensation section 118, 122, 126, 130, 132 of compensation portion 116 may have a substantially constant width. More specifically, in some embodiments, first compensation section 118 has a constant second width 120, second compensation section 122 has a constant third width 124, third compensation section 126 has a constant fourth width 128, fourth compensation section 130 has a constant third width 124 and fifth compensation section 132 has a constant second width 120.

In some embodiments, each compensation section can have a particular length, as determined by one or more compensation equations, described in more detail below. First compensation section 118 can have a second length 146, second compensation section 122 can have a third length 148, third compensation section 126 can have a fourth length 150, fourth compensation section 130 can have a fifth length 152 and fifth compensation section 132 can have a sixth length 154.

In some embodiments, first length 106 of first waveguide 104, length of each compensation section 118, 122, 126, 130 and 132, first width 112 of first waveguide 104 and widths 120, 124, 128, 124, 120 of each respective compensation section 118, 122, 126, 130 and 132 of compensation structure 102 can be determined using one or more compensation equations. More specifically, the first and the second waveguides of MZI filter 100 simultaneously satisfy:
wherein:
m=an integral multiple;

$$m\lambda_0 = L_1\left(n_1(\lambda_0) - \sum_i n_i(\lambda_0)\kappa_i\right)$$

$$v_{FSR} = \frac{c}{L_1\left(n_{g1} - \sum_i n_{gi}\kappa_i\right)}$$

$$\frac{\partial n_1}{\partial X_j} = \sum_i \kappa_i \frac{\partial n_i}{\partial X_j}$$

$$\frac{\partial^2 n_1}{\partial X_j \partial \omega} = \sum_i \kappa_i \frac{\partial^2 n_i}{\partial X_j \partial \omega}$$

$$\frac{\partial^2 n_1}{\partial X_j^2} = \sum_i \kappa_i \frac{\partial^2 n_i}{\partial X_j^2}$$

$\lambda_0$=wavelength of light in first and second arms;
$L_1$=reference length of first arm;
$\lambda_0$=central wavelength of light in first and second arms;
$L_i$=length of $i^{th}$ portion of second arm;
$\kappa_i = L_i/L_1$;
$v_{FSR}$=free spectral range;
c=speed of light;
$X_1$=waveguide width; and
$X_2$=waveguide thickness.

For example, in one embodiment, compensation equations can be used to define a compensation structure for a pump-rejection filter for a quantum computer having the following parameters:
 (i) 120 dB of pump rejection at wavelength $\lambda_0$=1.55 μm;
 (ii) 25 mdB of signal loss; and
 (iii) A free-spectral range (FSR) of 2.4 THz.

In other embodiments other suitable parameters can be defined for an MZI filter, as appreciated by one of skill in the art.

Figure 1B:
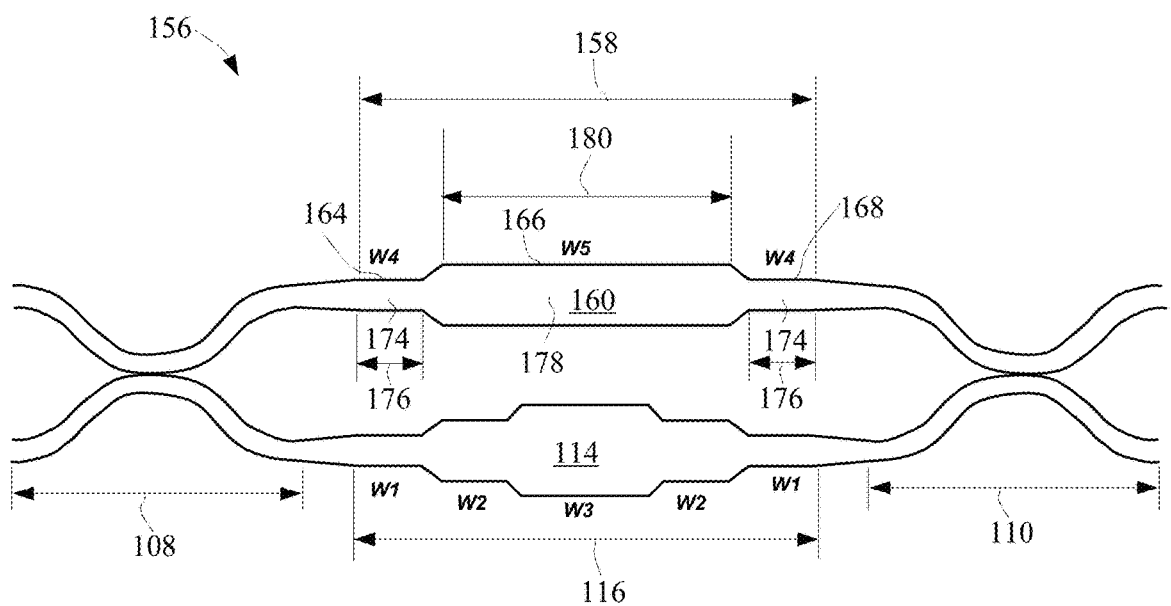
FIG. 1B illustrates a simplified plan view of an example Mach-Zehnder interferometer filter including two passive compensation structures, according to embodiments of the disclosure.

FIG. 1B illustrates a simplified plan view of an example MZI filter 156 including a passive compensation structure, according to an embodiment of the disclosure. As shown in FIG. 1B, MZI filter 156 is similar to MZI filter 100 illustrated in FIG. 1A. However, in this embodiment, MZI filter 156 includes a compensation portion positioned within each waveguide arm. More specifically, similar to MZI filter 100, MZI filter 156 includes compensation portion 116 positioned within second waveguide 114, however, MZI filter 156 also includes a second compensation portion 158 positioned within first waveguide 160, as described in more detail below. As appreciated by one of skill in the art with the benefit of this disclosure any combination of compensation portions can be employed in an MZI filter and the compensation portions do not need to be the same, or even have similar widths and/or lengths. As described in more detail below, each compensation portion can be uniquely designed according to the compensation equations.

As shown in FIG. 1B, first waveguide 160 includes second compensation portion 158 that includes a plurality of compensation sections, each having a width and a length as defined by a set of compensation equations, described in more detail herein. Second compensation portion 158 is positioned between first coupler section 108 and second coupler section 110. Second compensation portion 158 includes a sixth compensation section 164 having fifth width 174 and seventh length 176, a seventh compensation section 166 having sixth width 178 and a eighth length 180, and an eighth compensation section 168 having fifth width 174 and seventh length 176. As described above with regard to FIG. 1A, one or more taper portions can be positioned between waveguide sections of different widths to transition from one width to another width.

Figure 1C:
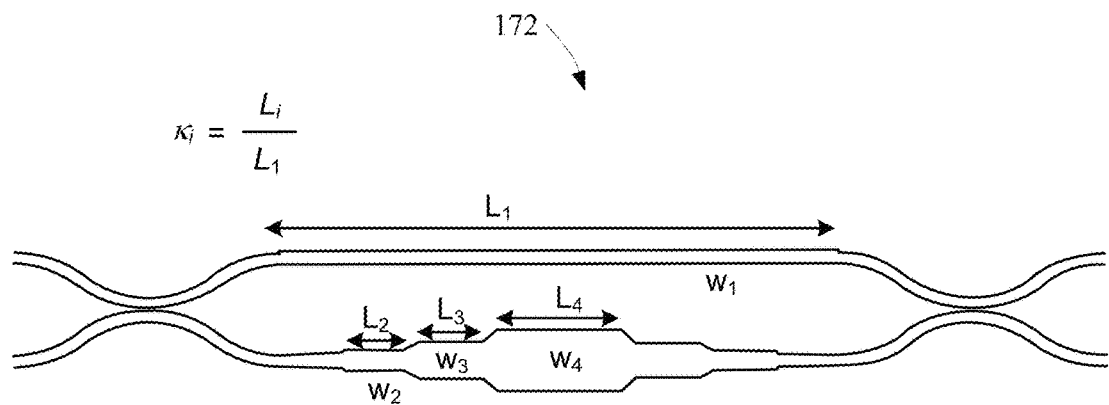
FIG. 1C illustrates a simplified plan view of an example Mach-Zehnder interferometer filter including a passive compensation structure, according to embodiments of the disclosure.

FIG. 1C illustrates a simplified model of an MZI filter 172 illustrating geometrical parameters for a set of compensation equations. As shown in FIG. 1C, an MZI filter 172 is shown having two parallel waveguides, each having a particular set of geometric parameters. In general, the phase difference between the two waveguide arms is given by Equation (1).

$$\phi(\omega) = k_1(\omega)L_1 - \Sigma_{i=2}^{n+2} k_i(\omega)L_i \quad \text{(Eq. 1)}$$

In Equation (1), $\omega$ is the angular frequency of light, $k_i(\omega)$ is the wave number corresponding to the $i^{th}$ waveguide width at angular frequency $\omega$, while $L_i$ refers to the length of the $i^{th}$ waveguide. Note that $L_i$ could be negative, in which case it would mean that it is located on the other arm. In one example, $L_1$, $L_2$, $L_4$ are positive while $L_3$ is negative, then the two arm lengths are $L_1+L_3$ and $L_2+L_4$. The simplest case of this class of structures is when each arm has a different but uniform width.

Several constraints may be satisfied by the filter design. Firstly, the pump with central wavelength $\lambda_0$ can be situated at a transmission minimum (since this is a pump-rejection filter). Therefore, the left-hand side (LHS) of Equation (1) corresponds an integral multiple m of $2\pi$ at the center wavelength $\lambda_0$. Since $k_i(\lambda_0)=2\pi n_i(\lambda_0)\lambda_0^{-1}$, for Equation (2). In writing down the expression for the transmission function, in some embodiments, it is proportional to $\sin^2(\emptyset/2)$. In various embodiments $\emptyset/2=m\pi$, or $\phi=2\,m\pi$.

$$m\lambda_0 = L_1(n_1(\lambda_0) - \Sigma_i n_i(\lambda_0)\kappa_i) \quad \text{(Eq. 2)}$$

In Equation (2), $\kappa_i = L_i/L_1$. In addition, in some embodiments, it may be desirable for the filter to possess a predetermined free-spectral range (FSR). The free-spectral range can be obtained by setting $\phi(\omega_0+2\pi v_{FSR})-\phi(\omega_0)=\pm 2\pi$. Since the FSR may be smaller than the central angular frequency $\omega_0$, the various $k_i$ can be expanded in a Taylor series about $k_i(\omega_0)$, where $dk_i/d\omega=v_{gi}^{-1}=n_{gi}/c$. Here $n_{gi}$ refers to the group refractive index at the center wavelength $\lambda_0$. This yields Equation (3) for $v_{FSR}$.

$$v_{FSR} = \frac{c}{L_1\left(n_{g1} - \sum_i n_{gi}\kappa_i\right)} \quad \text{(Eq. 3)}$$

To check the validity of Equation (3), a conventional MZI may be considered having arms of differing lengths $L_1$, $L_2$ but the same widths. This yields Equation (4) for $v_{FSR}$.

$$v_{FSR} = \frac{c}{n_{g1}(L_1 - L_2)} = \frac{c}{n_{g1}\Delta L} \quad \text{(Eq. 4)}$$

Next, constraints can be derived that make the system invariant to various sources of perturbation, $X_j$. This can be achieved by setting $$\frac{\partial \phi}{\partial X_j} = 0.$$

A generic approach can be used in which N+1 waveguide widths are used to mitigate N sources of perturbation. In addition, the resonant wavelength $\lambda_c$ (defined as the location of the transmission minimum in this case) can be made invariant to perturbations as shown in Equation (5).

$$\frac{\partial n_1}{\partial X_j} = \sum_i \kappa_i \frac{\partial n_i}{\partial X_j} \quad \text{(Eq. 5)}$$

Equation (5) is generally valid for various sources of perturbation. For example, $X_1 \equiv w$, where w is waveguide width and $X_2 \equiv h$, where h is waveguide thickness. Additional sources of perturbation can be defined, i.e. $X_3 \equiv T$, where T is temperature, etc. Each source of variation represents an additional linear equation with unknowns $\kappa_i$ for a given set of $w_i$.

While Equation (5) adjusts the resonant wavelength $\lambda_c$ (the wavelength at which a transmission minimum is present) to be invariant to perturbation, it does not make the shape of the transmission curve near the minimum invariant. In some embodiments, this condition can be imposed by setting the derivative of $\partial^2\phi/\partial\omega\partial X_j$ to be constant.

In some embodiments, an additional condition can be imposed to mitigate N different sources of variation yielding Equation (6).

$$\frac{\partial^2 n_1}{\partial X_j \partial \omega} = \sum_i \kappa_i \frac{\partial^2 n_i}{\partial X_j \partial \omega} \quad \text{(Eq. 6)}$$

Equation (6) also represents a set of linear equations with unknowns $\kappa_i$ for a given set of $w_i$. In Equation (6), the order of derivatives is swapped for the sake of convenience since $\partial n_i/\partial \omega$ is readily obtained from the effective-index dispersion of waveguides. Furthermore, Equations (2)-(3) can be reduced to a single equation with unknowns $\kappa_i$ by dividing Equation (2) by Equation (3) as shown below in Equations (7a) and (7b).

$$\frac{m\lambda_0}{c/FSR} = \gamma = \frac{\left(n_1(\lambda_0) - \sum_i n_i(\lambda_0)\kappa_i\right)}{\left(n_{g1} - \sum_i n_{gi}\kappa_i\right)} \quad \text{(Eq. 7a)}$$

$$\gamma n_{g1} - n_1 = \sum_i \kappa_i (\gamma n_{gi} - n_i) \quad \text{(Eq. 7b)}$$

Equations (5), (6) and (7b) represent a set of 2N+1 linear equations in $\kappa_i$ for 2N sources of perturbation or constraints. If Equation (6) is ignored, then there are N+1 linear equations in $\kappa_i$. Thus for a predefined set of N+1 waveguide widths, a solution is yielded by obtaining N+1 values of $\kappa_i$. Since the various partial derivatives enumerated above are real, a solution to the above problem is generated. Negative values of $\kappa_i$ are permitted since they represent that section being present in the 'other' arm. Thus, the above problem can therefore be cast into a form MX=B as shown below in Equation (8).

$$M = \begin{bmatrix} \gamma n_{g2} - n_2 & \gamma n_{g3} - n_3 & \cdots & \gamma n_{g(N+2)} - n_{N+2} \\ \frac{\partial n_2}{\partial X_1} & \frac{\partial n_3}{\partial X_1} & \cdots & \frac{\partial n_{N+2}}{\partial X_1} \\ \vdots & \vdots & \cdots & \vdots \\ \frac{\partial n_2}{\partial X_K} & \frac{\partial n_3}{\partial X_K} & \cdots & \frac{\partial n_{N+2}}{\partial X_K} \\ \frac{\partial^2 n_2}{\partial \omega \partial X_1} & \frac{\partial^2 n_3}{\partial \omega \partial X_1} & \cdots & \frac{\partial^2 n_{N+2}}{\partial \omega \partial X_1} \\ \vdots & \vdots & \cdots & \vdots \\ \frac{\partial^2 n_2}{\partial \omega \partial X_K} & \frac{\partial^2 n_3}{\partial \omega \partial X_K} & \cdots & \frac{\partial^2 n_{N+2}}{\partial \omega \partial X_K} \end{bmatrix} \quad \text{(Eq. 8)}$$

$$X = \begin{bmatrix} \kappa_2 \\ \kappa_3 \\ \vdots \\ \kappa_{N+2} \end{bmatrix}$$

$$B = \begin{bmatrix} \gamma n_{g1} - n_1 \\ \frac{\partial n_1}{\partial X_1} \\ \vdots \\ \frac{\partial n_1}{\partial X_K} \\ \vdots \\ \frac{\partial^2 n_1}{\partial \omega \partial X_1} \\ \vdots \\ \frac{\partial^2 n_1}{\partial \omega \partial X_K} \end{bmatrix}$$

The inventors have determined that for some compensation structures, particularly compensation structures that compensate for manufacturing variation in both waveguide width and waveguide height, the compensated structure can be characterized by a large device size, for example, a device length on the order of centimeters. Such large device sizes, although they may be fabrication-tolerant, may be characterized by higher than desired optical losses and be impractical for implementation using semiconductor processing techniques.

Accordingly, embodiments of the present invention provide MZI filters that include partial compensation structures. Although these partially compensated structures may only compensate for a fraction of the errors introduced due to variations in device structure, including waveguide width and waveguide height, the benefits in terms of reductions in device footprint can outweigh the impacts due to variation in fabrication parameters.

For partial compensation in which the system is partially invariant to various sources of perturbation, $X_j$, Equations (5), (6), and (8) can be updated to introduce a partial compensation factor $\varepsilon$, where $0<\varepsilon<1$. Different partial compensation factors can be introduced for different perturbations, for example, perturbations in width, thickness, etc. Thus, in general, a number of partial compensation factors $\varepsilon_1, \varepsilon_1, \ldots, \varepsilon_N$, each corresponding to a different perturbation, can be utilized. As an example 80% compensation (i.e., $\varepsilon_1=0.8$) can be utilized for width variations and 90% compensation (i.e., $\varepsilon_1=0.9$) can be utilized for height variations. For partial compensation using a single partial compensation factor E, Equation (5) can be rewritten as Equation (5'):

$$\varepsilon \frac{\partial n_1}{\partial X_j} = \sum_i \kappa_i \frac{\partial n_i}{\partial X_j} \quad \text{(Eq. 5')}$$

Equation (5') is generally valid for various sources of perturbation.

In some embodiments, an additional condition can be imposed to partially mitigate N different sources of variation yielding Equation (6').

$$\varepsilon \frac{\partial^2 n_1}{\partial X_j \partial \omega} = \sum_i \kappa_i \frac{\partial^2 n_i}{\partial X_j \partial \omega} \quad \text{(Eq. 6')}$$

Thus, for partial mitigation, M'X=B' as shown below in Equation (8').

$$M' = \begin{bmatrix} \gamma n_{g2} - n_2 & \gamma n_{g3} - n_3 & \cdots & \gamma n_{g(N+2)} - n_{N+2} \\ \frac{\partial n_2}{\partial X_1} & \frac{\partial n_3}{\partial X_1} & \cdots & \frac{\partial n_{N+2}}{\partial X_1} \\ \vdots & \vdots & \cdots & \vdots \\ \frac{\partial n_2}{\partial X_K} & \frac{\partial n_3}{\partial X_K} & \cdots & \frac{\partial n_{N+2}}{\partial X_K} \\ \frac{\partial^2 n_2}{\partial \omega \partial X_1} & \frac{\partial^2 n_3}{\partial \omega \partial X_1} & \cdots & \frac{\partial^2 n_{N+2}}{\partial \omega \partial X_1} \\ \vdots & \vdots & \cdots & \vdots \\ \frac{\partial^2 n_2}{\partial \omega \partial X_K} & \frac{\partial^2 n_3}{\partial \omega \partial X_K} & \cdots & \frac{\partial^2 n_{N+2}}{\partial \omega \partial X_K} \end{bmatrix} \quad \text{(Eq. 8')}$$

$$X = \begin{bmatrix} \kappa_2 \\ \kappa_3 \\ \vdots \\ \kappa_{N+2} \end{bmatrix}$$

$$B' = \begin{bmatrix} \gamma n_{g1} - n_1 \\ \varepsilon_1 \frac{\partial n_1}{\partial X_1} \\ \vdots \\ \varepsilon_2 \frac{\partial n_1}{\partial X_\kappa} \\ \vdots \\ \varepsilon_3 \frac{\partial^2 n_1}{\partial \omega \partial X_1} \\ \vdots \\ \varepsilon_N \frac{\partial^2 n_1}{\partial \omega \partial X_\kappa} \end{bmatrix}$$

In some embodiments, $\varepsilon_1=\varepsilon_2=\varepsilon_3=\varepsilon_N=\varepsilon$ and the same compensation factor is utilized for all perturbations. One of ordinary skill in the art would recognize many variations, modifications, and alternatives.

Accordingly, embodiments of the present invention enable the fabrication of partially compensated MZI filters in which a first waveguide has a first length and a first continuous width and a second waveguide has a second length and a plurality of widths along the second waveguide. For equal partial compensation for waveguide width and thickness variations (i.e., $\varepsilon_1=\varepsilon_2=\varepsilon_3$), the first and the second waveguides simultaneously satisfy:

$$m\lambda_0 = L_1(n_1(\lambda_0) - \Sigma_i n_i(\lambda_0)\kappa_i)$$

$$v_{FSR} = \frac{1}{L_1(n_{g1} - \Sigma_i n_{gi}\kappa_i)}$$

$$\varepsilon \frac{\partial n_1}{\partial X_j} = \Sigma_i \kappa_i \frac{\partial n_i}{\partial X_j}$$

$$\varepsilon \frac{\partial^2 n_1}{\partial X_j \partial \omega} = \Sigma_i \kappa_i \frac{\partial^2 n_i}{\partial X_j \partial \omega}$$

$$\varepsilon \frac{\partial^2 n_1}{\partial X_j^2} = \Sigma_i \kappa_i \frac{\partial^2 n_i}{\partial X_j^2}$$

where:
m=an integral multiple;
$L_1$=a reference length of the first waveguide;
$\lambda_0$=a central wavelength of light in the first and the second waveguides;
$L_i$=a length of an $i^{th}$ portion of the second waveguide;
$n_1$=a modal refractive index of the first waveguide;
$n_i$=a modal refractive index of an $i^{th}$ portion of the second waveguide;
$n_{g1}$=a group refractive index at a central wavelength/$\lambda_0$ for the first waveguide;
$n_{gi}$=a group refractive index at the center wavelength $\lambda_0$;
$\kappa_i = L_i/L_1$;
$v_{FSR}$=free spectral range;
c=speed of light;
Xj=a number of sources of perturbation;
$\omega$=angular frequency;
$X_1$=a waveguide width;
$X_2$=a waveguide thickness; and
$\varepsilon$ is a compensation factor greater than zero and less than one.

Figure 1D:
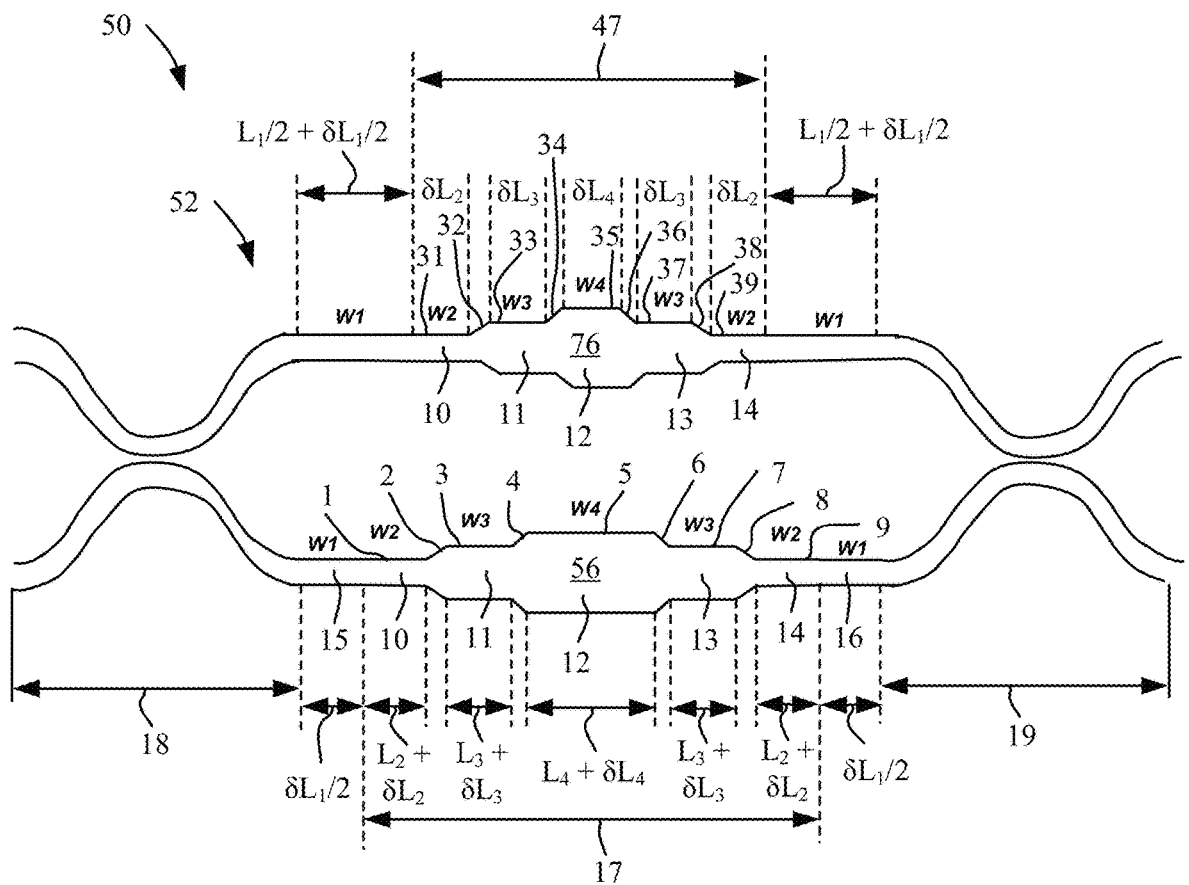
FIG. 1D illustrates a simplified plan view of an example MZI filter including a phase-balanced, passive compensation structure, according to an embodiment of the disclosure.
Figure 1E:
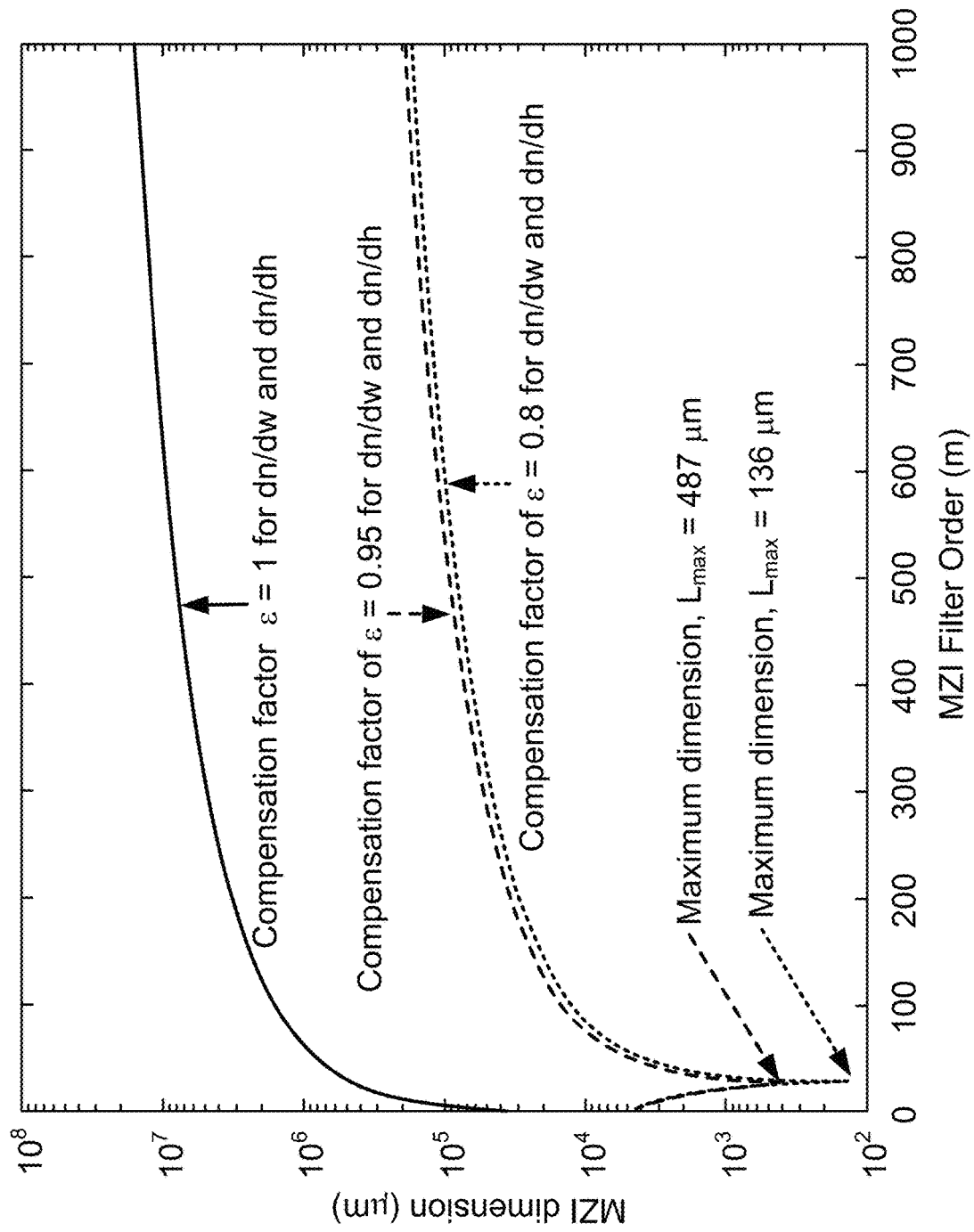
FIG. 1E is a set of plots illustrating MZI dimension as a function of filter order for differing compensation factors, according to embodiments of the disclosure.

FIG. 1E is a set of plots illustrating MZI dimension as a function of filter order for differing compensation factors, according to embodiments of the disclosure. For FIG. 1E, a waveguide fabricated using a silicon nitride core and a silicon oxide cladding with waveguide widths of W1=0.9 µm, W2=1.2 µm, W3=1.5 µm, and W4=1.8 µm is analyzed. The computations of the dimensions of the MZI shown in FIG. 1E are for a free spectral range of 42.5 nm. The dimensions illustrated in FIG. 1E are for the largest dimension associated with the MZI. Perfect compensation of width $$\left(\frac{\partial n_1}{\partial w}\right)$$

and height $$\left(\frac{\partial n_1}{\partial h}\right),$$

i.e., $\varepsilon=1$, will result in an MZI dimension of ~20 mm for low order (e.g., m=1) operation. As devices reach such dimensions, implementation using semiconductor processing technology becomes challenging.

In contrast, slight decreases in the compensation factor, for example, a decrease in compensation factor of only 5%, resulting in a compensation factor $\varepsilon=0.95$, will result in a decrease in MZI dimension of greater than an order of magnitude, reducing the MZI dimensions to 487 µm for m≈30. For this computation, the compensation factors for the perturbations in waveguide width and waveguide height are equal. This unexpected and nonlinear decrease in MZI dimension results in devices that have lengths suitable for semiconductor processing. If the compensation factor is set at $\varepsilon=0.8$, the MZI dimension decreases further to 136 µm for m≈30. In FIG. 1E, the minimum of the MZI dimension is illustrated, indicating the footprint of the MZI device. The behavior illustrated in FIG. 1E is quite unexpected since small changes in the compensation factor result in large changes in MZI dimensions, including a 40-fold decrease in MZI dimensions for a 5% decrease in correction factor. This large impact on MZI dimensions produced by minor changes in the correction factor is not only unexpected, but provides significant value and benefits since the MZI dimension reductions enable implementation using conventional semiconductor processing techniques.

FIG. 1F is a set of plots showing a magnified portion of the set of plots in FIG. 1E. Thus, in FIG. 1F, the plots shown in FIG. 1E are reproduced over a narrower range of MZI dimensions and orders. Additionally, in addition to plots for $\varepsilon=0.95$ and $\varepsilon=0.8$, a plot for $\varepsilon=0.9$ is added. The plots are associated with a free spectral range of ~40 nm. As illustrated in FIG. 1F, use of the compensation factor ε=0.95 corresponds to plot A and results in a minimum MZI length of 487 μm for order m=25. Use of the compensation factor ε=0.9 results in a minimum MZI length of approximately 300 for order m=27. Use of the compensation factor ε=0.8 results in a minimum MZI length of 136 μm for order m=27.

Thus, embodiments of the present invention provide a wide design window in which the desired MZI dimensions can be traded off against the level of fabrication tolerance compensation corresponding to the selected correction factor.

Although FIGS. 1A and 1C illustrate an MZI filter in which the first waveguide has a first length and a first continuous width and the second waveguide has a second length and a plurality of widths along the second waveguide, other embodiments of the present invention utilize a first waveguide with differing widths. The inventors have determined that the use of tapered regions, also referred to as taper portions, in one waveguide, but not the other waveguide, may introduce phase differences or phase imbalance between the two waveguides. Accordingly, in some embodiments, each waveguide includes all waveguide widths with tapered regions joining waveguide sections with differing widths. As a result, each waveguide has all waveguide widths present, with the first waveguide utilizing buffer sections to implement the differing widths. The lengths associated with the buffer sections in the first waveguide are added to the corresponding sections in the second waveguide to maintain the desired length difference (and resulting phase difference) between the two waveguides. Additionally, matching taper portions are present in both waveguides, resulting in any phase differences introduced by the presence of the taper portions being canceled out. Thus, the addition of all waveguide widths in both waveguides and matching taper portions results in the original phase difference between the waveguides being preserved while canceling out any phase imbalances introduced by the differing width and taper portions.

FIG. 1D illustrates a simplified plan view of an example MZI filter including a phase-balanced, passive compensation structure, according to an embodiment of the disclosure. Referring to FIG. 1D, example MZI filter 50 includes a passive compensation structure 52 that is phase-balanced, according to an embodiment of the disclosure. As shown in FIG. 1D and in comparison to FIG. 1A, MZI filter 50 includes a first waveguide 76 that, rather than having a uniform width between first coupler section 18 and second coupler section 19, is characterized by differing widths that correspond to differing widths of second waveguide 56. The differing widths of first waveguide 76 are described in additional detail below. As a result, embodiments provide different waveguide widths as appropriate to compensate for manufacturing variation, with each different width present in each waveguide and matching taper portions in each waveguide.

Second waveguide 56 includes a compensation portion 17 positioned between first coupler section 18 and second coupler section 19. Compensation portion 17 includes a first compensation section 1 having a second width 10, a second compensation section 3 having a third width 11 and a third compensation section 5 having a fourth width 12. In some embodiments, fourth width 12 is greater than third width 11 and the third width is greater than second width 10. In some embodiments, the width and length of each compensation portion can be determined using one or more compensation equations, as described in more detail below.

In some embodiments, compensation portion 17 is symmetric along second waveguide 56 and further includes a fourth compensation section 7 having third width 13 and a fifth compensation section 9 having first width 16.

In the embodiment illustrated in FIG. 1D, compensation structure 52 may also include a buffer portion 47 positioned within first waveguide 76. Buffer portion 47 positioned between first coupler section 18 and second coupler section 19 includes a first buffer section 31 having second width 10 (i.e., W2), a second buffer section 33 having third width 11 (i.e., W3) and a third buffer section 35 having fourth width 12 (i.e., W4). In the embodiment illustrated in FIG. 1D, buffer portion 47 is symmetric along first waveguide 76 and further includes a fourth buffer section 37 having third width 13 and a fifth buffer section 39 having first width 16.

In various embodiments, one or more taper portions can be positioned in-between each compensation section and each buffer section to transition between different waveguide widths. For purposes of clarity the taper portion between the waveguide sections with first width 15 (i.e., W1) and first buffer section 31 in first waveguide 76 and first width 15 (i.e., W1) and first compensation section 1 in second waveguide 56 are not shown. Referring to first waveguide 76, first taper portion 32 and second taper portion 34 are illustrated between first buffer section 31 and second buffer section 33 and between second buffer section 33 and third buffer section 35, respectively. Similarly, in this symmetric configuration, third taper portion 36 and fourth taper portion 38 are illustrated between third buffer section 35 and fourth buffer section 37 and between fourth buffer section 37 and fifth buffer section 39, respectively. As discussed above, in some embodiments, first waveguide 76 can also include one or more taper portions to transition widths between first coupler section 18 to first waveguide 76 and from the first waveguide to second coupler section 19.

Referring to second waveguide 56, first taper portion 2 and second taper portion 4 are illustrated between first compensation section 1 and second compensation section 3 and between second compensation section 3 and third compensation section 5, respectively. Similarly, in this symmetric configuration, third taper portion 6 and fourth taper portion 8 are illustrated between third compensation section 5 and fourth compensation section 7 and between fourth compensation section 7 and fifth compensation section 9, respectively. As discussed above, in some embodiments, second waveguide 56 can also include one or more taper portions to transition widths between first coupler section 18 to second waveguide 56 and from the second waveguide to second coupler section 19.

In some embodiments, each compensation section 1, 3, 5, 7, 9 of compensation portion 17 and each buffer section 31, 33, 35, 37, and 39 of buffer portion 47 may have a substantially constant width. More specifically, in some embodiments, first compensation section 1 has a constant second width 10, second compensation section 3 has a constant third width 11, third compensation section 5 has a constant fourth width 12, fourth compensation section 7 has a constant third width 13, and fifth compensation section 9 has a constant second width 14. Moreover, first buffer section 31 has a constant second width 10, second buffer section 33 has a constant third width 11, third buffer section 35 has a constant fourth width 12, fourth buffer section 37 has a constant third width 13, and fifth buffer section 39 has a constant second width 14.

In some embodiments, each compensation section can have a particular length, as determined by one or more compensation equations, described in more detail below. In order to provide a consistent phase shift between compensations sections in first waveguide 76 and buffer sections in second waveguide 56, the taper portions are designed to be consistent between both waveguides. Thus, first taper portion 2 and first taper portion 32 are the same, second taper portion 4 and second taper portion 34 are the same, etc. Thus, any phase shift due to light propagating through the taper portions is equal in both the compensation sections and the buffer sections. Additionally, any variation in the taper portions resulting from manufacturing processes is reduced or minimized by utilizing identical tapers in both waveguides.

Referring to FIG. 1A, as light propagates between first coupler section 108 and second coupler section 110, first waveguide 104 is characterized by a first length 106 and second waveguide is characterized by a length equal to the sum of second length 146, third length 148, fourth length 150, fifth length 152, and sixth length 154 along with the lengths of the taper portions between compensation sections. In FIG. 1D, in order to implement a phase difference between the waveguides based on differences in lengths, for first waveguide 76, the length of the portion of first waveguide 76 adjacent first coupler section 18 with first width W1 is $L_1/2 + \delta L_1/2$ and the length of the portion of first waveguide 76 adjacent second coupler section 19 with first width W1 is $L_1/2 + \delta L_1/2$. For second waveguide 56, the length of the portion of second waveguide 56 adjacent first coupler section 18 with first width 15 is $\delta L_1/2$, and the length of the portion of second waveguide 56 adjacent second coupler section 19 with first width 16 is $\delta L_1/2$. As shown in Table 1, the length of the buffer sections is added to the corresponding compensation section in order to eliminate any phase imbalance that would otherwise be introduced by the buffer sections. The length of each taper portion is the same as discussed above and the lengths of the buffer sections and the compensation sections are:

| Waveguide | Buffer Section | Length | Waveguide | Compensation Section | Length |
|---|---|---|---|---|---|
| First | 31 | $\delta L_2$ | Second | 1 | $L_2 + \delta L_2$ |
| First | 33 | $\delta L_3$ | Second | 3 | $L_3 + \delta L_3$ |
| First | 35 | $\delta L_4$ | Second | 5 | $L_4 + \delta L_4$ |
| First | 37 | $\delta L_3$ | Second | 7 | $L_3 + \delta L_3$ |
| First | 39 | $\delta L_2$ | Second | 9 | $L_2 + \delta L_2$ |

Accordingly, in comparison with the embodiment illustrated in FIG. 1A, the embodiment illustrated in FIG. 1D increases the length of the portions adjacent first coupler section 18 and second coupler section 19 by $\delta L_1/2$ and each compensation section in the second waveguide by $\delta L_2$, $\delta L_3$, and $\delta L_4$, respectively, in order to increase the lengths by the lengths of the buffer sections in the first waveguide as well as providing taper portions that can be consistent between both waveguides. Accordingly, the net phase difference corresponding to the length difference between $L_1$ and $(L_2+L_3+L_4)$ is achieved, but with reduced or no impact resulting from the presence of the buffer sections and the taper portions. The lengths of the buffer sections introduced into first waveguide 76 and added to the compensation sections in second waveguide 56, i.e., $\delta L_1$, $\delta L_2$, $\delta L_3$, and $\delta L_4$ can be the same or different. In some embodiments, the length of the buffer section is a fraction, for example, ~1% of the lengths $L_1$, $L_2$, $L_3$, or $L_4$.

Figure 2:
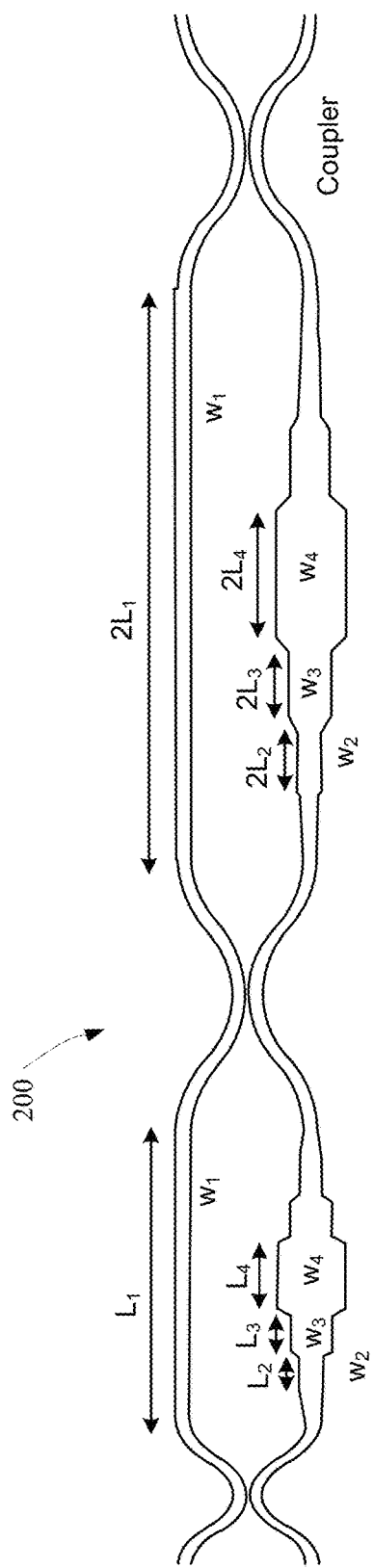
FIG. 2 illustrates a single stage of a three-waveguide cascaded third order MZI based filter, according to embodiments of the disclosure.
Figure 3:
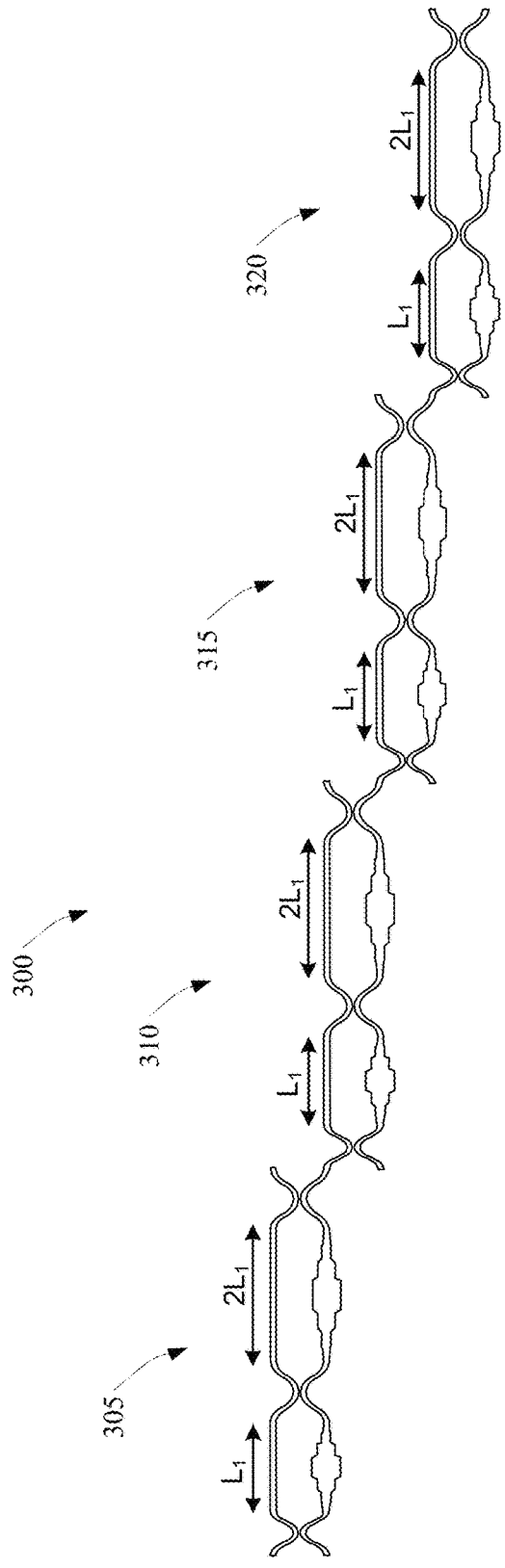
FIG. 3 illustrates an incoherently cascaded third-order MZI filter having four stages, according to embodiments of the disclosure.

FIG. 2 illustrates a single stage of a three-waveguide cascaded third order MZI-based filter 200 using a solution to Equation (8). Each stage can be incoherently cascaded as shown in FIG. 3 that illustrates an incoherently cascaded third-order MZI filter 300 having four stages 305, 310, 315, 320.

Although FIG. 2 illustrates a cascaded third order MZI-based filter in which one of the waveguides in each MZI filter has a constant width, the MZI filter illustrated in FIG. 1D can be utilized in cascaded implementations, with both waveguides having differing widths. As an example, the MZI filter illustrated in FIG. 1D can be cascaded with a version of the MZI filter illustrated in FIG. 1D, but with all of the lengths $L_1$, $L_2$, $L_3$, and $L_4$ doubled.

In some embodiments, it may be considered that the above set of equations do not consider loss or extinction ratio thus it may be possible that the obtained lengths from the above set of constraints violate the parameters of the extinction ratio.

In some embodiments, the use of more or less than N+1 waveguide widths can be used. In either case, the problem is modified to an optimization problem, i.e. a solution to min(MX−B) is desirable.

In some embodiments, the transitions in waveguide widths may not considered because the waveguide widths may be marginally different and therefore the transition lengths between these may not be relatively large, approximately 1 micron, in one embodiment. This can be relatively smaller than the length of one of the arms, for example, approximately 100 microns, in one embodiment.

The discussion above disclosed an approach to make the MZI's tolerant to sources of perturbation. The next section discloses a design process including an approach to test the statistical performance of an MZI device.

The first step is to define the geometry of the device and obtain refractive indices of waveguides as functions of w, h, T . . . and other variables for various angular frequencies ω. In some embodiments, this can be accomplished using commercial mode solvers. Upon obtaining this information, it can be stored in the form of look-up tables. To simplify storing the spectral dependencies, the refractive index data can be fit as follows and the coefficients n, $\partial n/\partial \omega$, $\partial^2 n/\partial \omega^2$ can be stored yielding Equation (9).

$$n(\omega, X_1 \ldots X_N) = n(\omega_0, X_1 \ldots X_N) + \frac{\partial n(X_1 \ldots X_n)}{\partial \omega}(\omega - \omega_0) + \frac{\partial^2 n(X_1 \ldots X_N)}{\partial \omega^2}(\omega - \omega_0)^2 \quad \text{(Eq. 9)}$$

Equation (8) can then be solved to obtain various ratios $\kappa_i$. If an exact solution cannot be obtained, variation of the central resonant wavelength $\Delta \lambda_c$ can be minimized for given standard deviations in perturbation sources $\Delta_{X_j}$ according to Equation (10).

$$\Delta \lambda_c = \lambda_0 \frac{\Sigma_j \sigma_{X_j} \left| \frac{\partial n_1}{\partial X_j} - \sum_{i=2}^{N+2} \kappa_i \frac{\partial n_i}{\partial X_j} \right|}{n_{g1} - \sum_{i=2}^{N+2} \kappa_i n_{gi}} \quad \text{(Eq. 10)}$$

The value of $L_1$ can be determined using Equation (3). The second MZI in the third-order MZI will can possess $L'_1 = 2L_1$ but the same values of $\kappa_i$. Using the obtained values of $L_i$, the values of $t_1$, $t_2$, $t_3$ may be optimized as well as a number of stages N to meet the specifications of extinction ratio, transmission loss and extinction bandwidth. In some embodiments, extinction bandwidth (BW) may be larger than the central wavelength shift $\Delta\lambda_c$, e.g. BW>>$\Delta\lambda_c$. A Monte-Carlo analysis of the system can be performed by repeating a relatively large number ($R_N$) of random simulations. The sampling can be conducted with knowledge of correlations in a representative fabrication process. In some embodiments, the process can be repeated until a favorable yield is obtained.

In some embodiments, numerical methods can be used to develop a MZI filter. The output of a filter can obtained using transfer matrices. A cascaded third-order filter can include directional couplers and the propagation of light in the two arms. A filter can be defined to be third-order when two asymmetric MZI's of differential length $\Delta L$ and $2\Delta L$ are cascaded coherently. The transfer matrices for directional couplers and MZI arms are shown in Equation (11).

$$M_c = \begin{bmatrix} t & -jK \\ -jK & t \end{bmatrix}, M_{pm} = \alpha^{1/2}\begin{bmatrix} e^{-j\phi_m}\alpha_m & 0 \\ 0 & 1 \end{bmatrix} \quad \text{(Eq. 11)}$$

In Equation (11), $|t|^2$ is the transmission coefficient of the directional coupler. Notably, $K=\sqrt{1-|t|^2}$ while $\emptyset_r$(r=1, 2) corresponds to the differential phase in each of the two asymmetric MZI's that constitute a cascaded third-order filter. $\alpha_m = e^{-r\alpha'\Delta L/2}$ correspond to the additional losses that accrue due to the differential length in each MZI, while $\alpha = e^{-r\alpha'L/2}$ is the common absorption experienced by the nominal length L of the MZI arms. For the general multi-waveguide case, $L=\min(L_1, \Sigma_i\kappa_iL_i)$ and $\Delta L=|L_1-\Sigma_i\kappa_iL_i|$. Note that $\alpha'$ is the absorption coefficient in units of 1/meter.

Upon utilizing the above transfer matrices the following expressions for the elements $H_{mk}$ of the overall transfer matrix of the cascaded third-order filter was obtained. A single third-order filter can be defined by three couplers with corresponding parameters $t_1$, $t_2$, $t_3$ and two phase and absorption terms $\emptyset_r$, $\alpha_r$, where r=1,2 as shown in Equations (12a), (12b), (12c) and (12d).

$H_{11}(\omega)=\alpha[-K_1(\omega)(t_2(\omega)K_3(\omega)+\alpha_2K_2(\omega)t_3(\omega)e^{-j\phi_2(\omega)})$
$-\alpha_1 t_1(\omega)e^{-j\phi_1(\omega)}(K_2(\omega)K_3(\omega)-\alpha_2 t(\omega)t_3(\omega)$
$e^{-j\phi_2(\omega)})]$ (Eq. 12a)

$H_{12}(\omega)=\alpha[-jt_1(\omega)(K_3(\omega)t_2(\omega)+\alpha_2K_2(\omega)t_3(\omega)e^{-j\phi_2(\omega)})$
$+j\alpha_1(\omega)K_1(\omega)e^{-j\phi_1(\omega)}(K_2(\omega)K_3(\omega)-\alpha_2 t(\omega)t_3$
$(\omega)e^{-j\phi_2(\omega)})]$ (Eq. 12b)

$H_{21}(\omega)=\alpha[t_1-jK_1(\omega)(t_2(\omega)t_3(\omega)+\alpha_2K_2(\omega)K_3(\omega)$
$e^{-j\phi_2(\omega)})-j\alpha_1 t_1(\omega)e^{-j\phi_1(\omega)}(K_2(\omega)t_3(\omega)-\alpha_2 t_2(\omega)K_3$
$(\omega)e^{-j\phi_2(\omega)})]$ (Eq. 12c)

$H_{22}(\omega)=\alpha[-t_1(\omega)(t_2(\omega)t_3(\omega)+\alpha_2K_2(\omega)K_3(\omega)e^{-j\phi_2(\omega)})+$
$j\alpha_1k_1(\omega)e^{-j\phi_1(\omega)}(K_2(\omega)t_3(\omega)-\alpha_2K_3(\omega)t_2$
$(\omega)e^{-j\phi_2(\omega)})]$ (Eq. 12d)

The validity Equations (12a)-(12d) can be shown by verifying that $|H_{qp}(\omega)|^2+|H_{pp}(\omega)|^2=1$ for q, p=1, 2 under conditions of no loss (i.e. $\alpha'=0$). This relates to the conservation of energy. The transmission loss and pump-rejection ratios can be calculated in Equations (13a) and (13b), respectively.

$$t_{loss} = 10\log_{10}\left(\frac{\int_{-\infty}^{\infty}|E_{out,1}(\omega)|^2(I_s(\omega)+I_i(\omega))d\omega}{\int_{-\infty}^{\infty}[I_s(\omega)+I_i(\omega)]d\omega}\right) dB \quad \text{(Eq. 13a)}$$

$$t_{pump} = 1000 \times 10\log_{10}\left(\frac{\int_{-\infty}^{\infty}|E_{out,2}(\omega)|^2 I_p(\omega)d\omega}{\int_{-\infty}^{\infty}I_p(\omega)d\omega}\right) mdB \quad \text{(Eq. 13b)}$$

Figure 4:
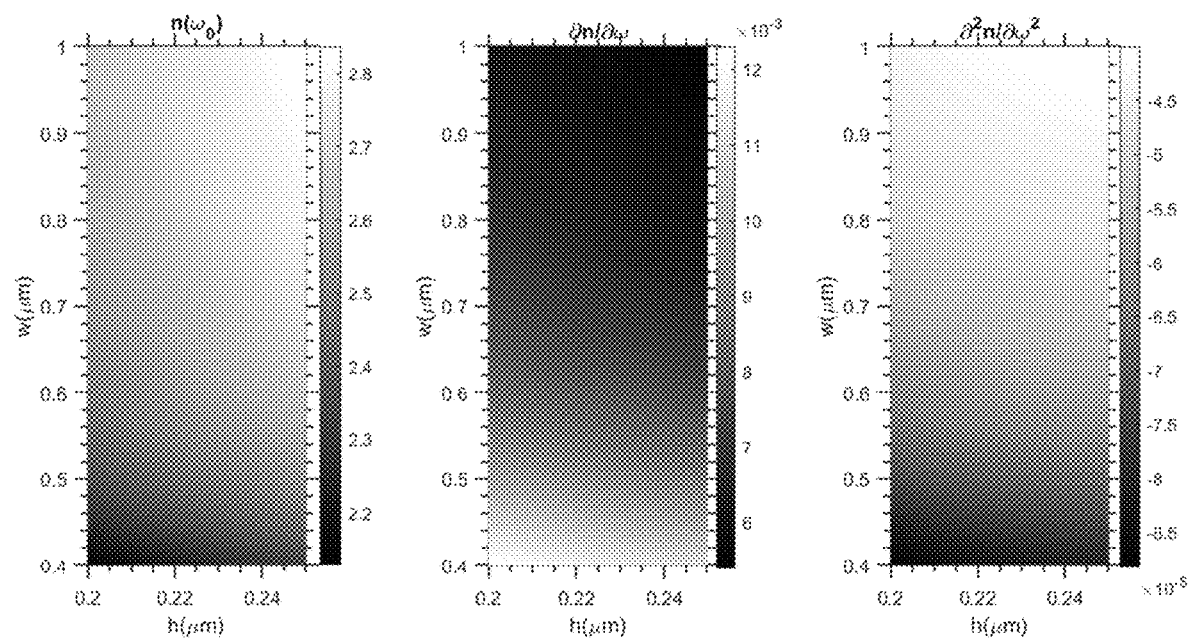
FIG. 4 illustrates effective index parameters as a function of waveguide width and height for a silicon-on-insulator waveguide, according to embodiments of the disclosure.

In these embodiments the waveguides considered are silicon-on-insulator (SOI) strip waveguides, however other embodiments can use different configurations. The material dispersion can be based on the Palik model at room temperature. The dispersion of the effective index can be fit according to Equation (9). In this embodiment the center wavelength $\lambda_0=2\pi c/\omega_0=1.55$ µm. The obtained coefficients are plotted in FIG. 4 showing the effective index parameters as a function of waveguide width and height for a silicon-on-insulator waveguide. The obtained effective index is fit to Equation (9).

Figure 5A:
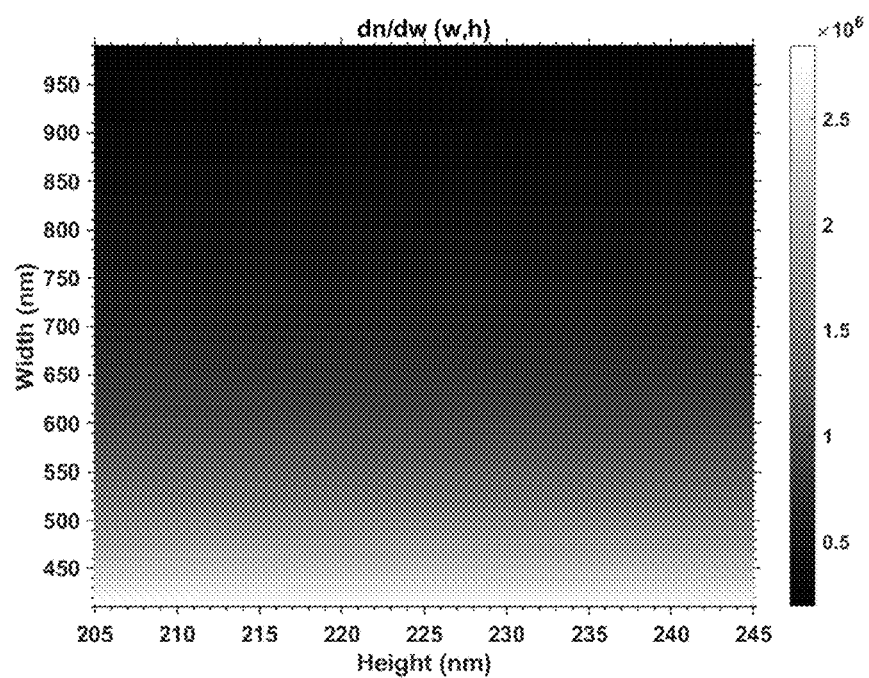
FIGS. 5A and 5B illustrate a plotted derivative, according to embodiments of the disclosure.
Figure 5B:
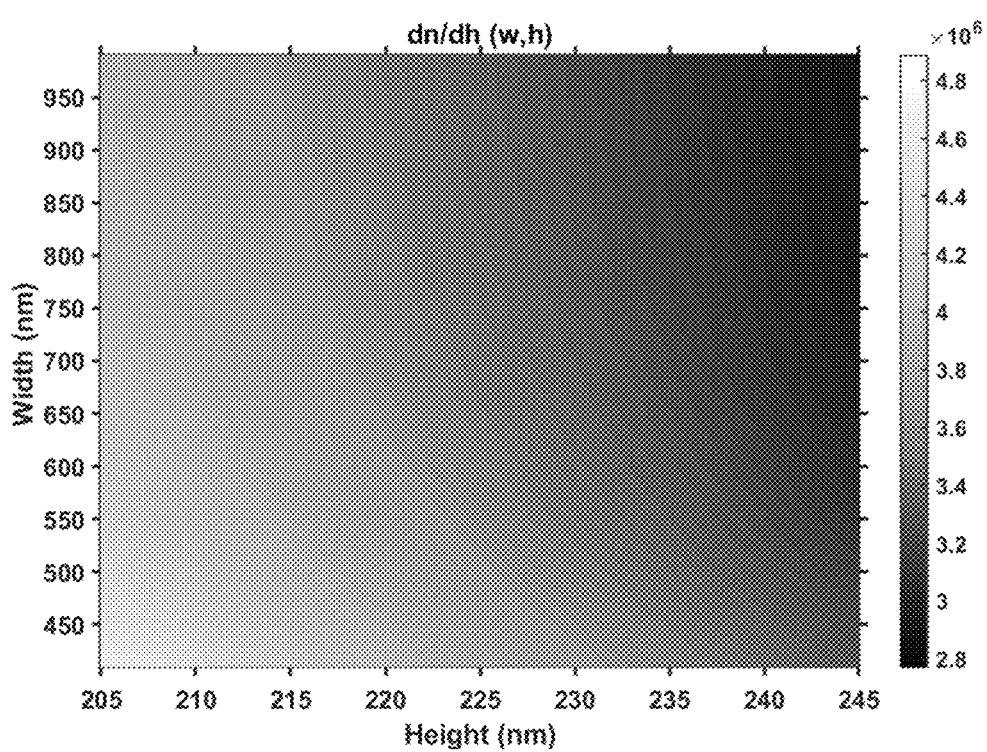

A full parameter sweep of the refractive index over angular frequency $\omega$, waveguide width (w) and thickness (h) is performed. In FIGS. 5A-5B, the derivatives are plotted with respect to w, h of the effective index at the wavelength $\lambda_0=1.55$ µm.

In FIGS. 5A and 5B, the derivative $\partial n/\partial w$ is plotted. The value is invariant with thickness but changes dramatically with width. This indicates that waveguide width variations can be mitigated using this approach. On the other hand, while $\partial n/\partial h$ does vary with width, it only does so mildly; it varies more with regard to thickness. The magnitude of change is about four times larger than $\partial n/\partial w$. In some embodiments, standard deviations a h of the thickness tend be smaller than those of the widths (see Table 2 showing parameters of simulations), which reduces their impact.

TABLE 2

Parameters used for simulations.

| Parameter | Value |
|---|---|
| Standard deviation of waveguide width ($\sigma_w$) | 3 nm[5] |
| Standard deviation of waveguide height($\sigma_h$) | 0.5 nm[6] |
| Material index | Palik (from Lumerical) |
| Temperature (T) | 300 K |
| Absorption coefficient ($\alpha'$) | 0.3 dBcm$^{-1}$ or 7.5 m$^{-1}$ |
| Transmission coefficients ($|t_1(w_0)|^2$, $|t_2(w_0)|^2$, $|t_3(w_0)|^2$) | 0.5, 0.75, 0.93 |
| Number of stages | 4 |
| Pump, signal and idler distributions | Gaussian with 5 GHz e$^{-2}$ bandwidth |
| Correlations | w, h for each third-order MZI stage uncorrelated. |

Due to the relative invariance of ∂n/∂h, with respect to w, the strategy of using multiple waveguide widths to mitigate variation in this parameter may not be very efficacious for particular applications. In principle, a solution is possible but the lengths of arms obtained turn out to be in the range of centimeters which can be too large for some applications. Therefore, in some applications that may benefit from small filter sizes, it would be beneficial to reduce the values of $\sigma_h$.

The coupling coefficients of the directional couplers can be determined by obtaining the even and odd modes of the coupled waveguide system. The coupling length can then be determined according to Equation (14).

$$t_m(\omega) = \sin\left[\frac{\Delta n(\omega)\lambda_0}{\Delta n(\omega_0)\lambda}\sin^{-1}(t_m(\omega_0))\right] \quad \text{(Eq. 14)}$$

Figure 6:
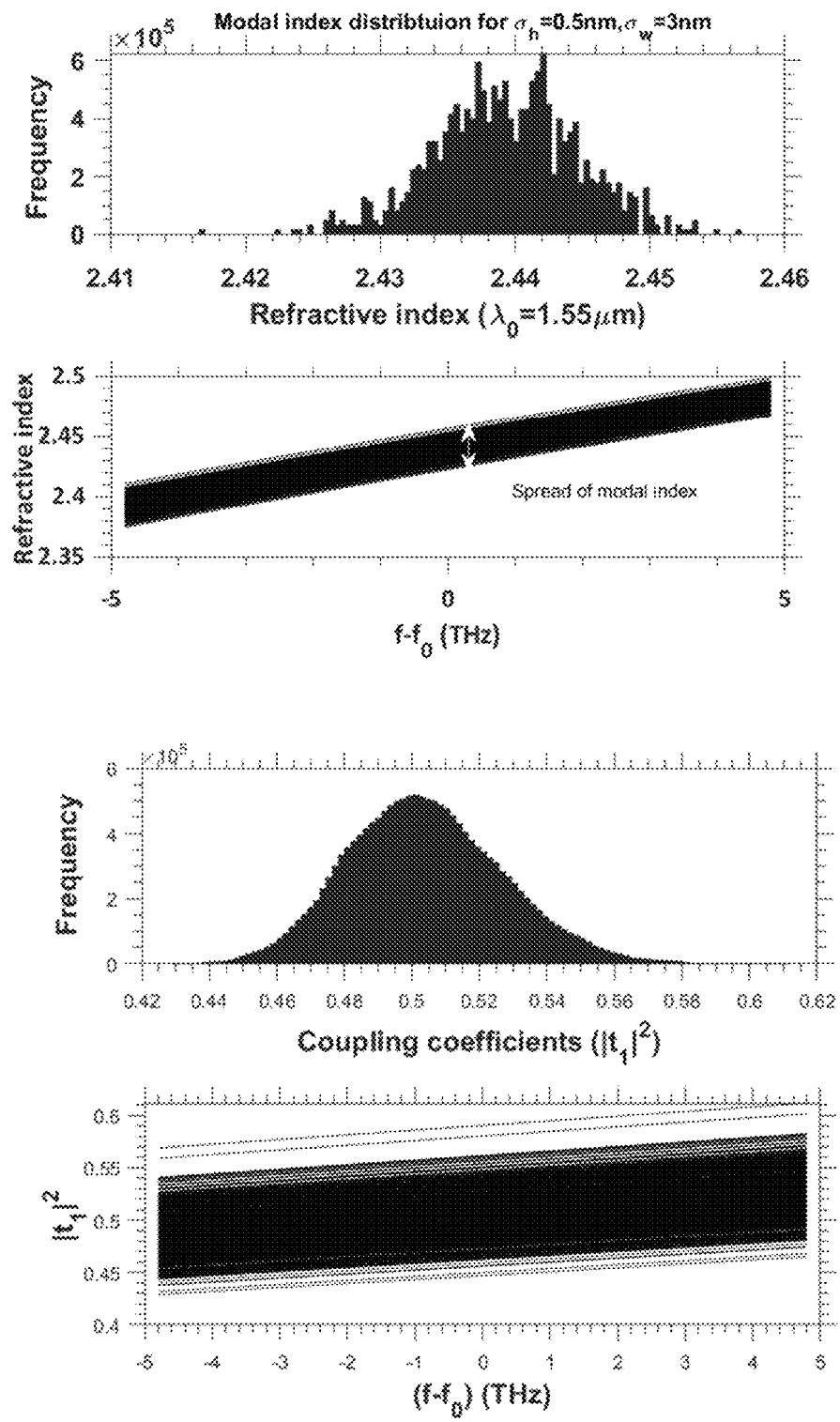
FIG. 6 illustrates standard deviations for waveguides and couplers, according to embodiments of the disclosure.

The statistical performance of standard cascaded third-order filters is examined to estimate the yield for such devices. In this approach a Monte-Carlo calculation was employed. Waveguide widths and thicknesses were chosen at random and their effective indices are obtained from the previously generated look-up tables. Similarly, the effective super-mode indices of the couplers are obtained. The coupling coefficients are then calculated using Equation (14) and the parameters from Table 2 are used. The standard deviations for waveguide width $\sigma_w=3$ nm and thickness $\sigma_h=0.5$ nm are plotted in FIG. 6 showing statistical distributions of effective index $n_{\mathit{eff}}$.

In this embodiment the entire dispersion curve has been shifted. The distribution of effective indices is slightly asymmetric. Therefore, in assuming a 3 nanometer waveguide width standard deviation and 0.5 nanometer standard deviation in thickness, this example evaluates variations more germane to die-to-die or intra-die variations. Therefore, a relevant parameter may be the critical dimension uniformity (CDU).

The overall performance for a N=4 stage, incoherently cascaded third-order filter can then be obtained. The design described above had the goal of meeting the specifications for a pump rejection filter, that can be, in one example, 120 dB of rejection and 50 mdB of loss. However, from FIG. 7 that shows the statistical behavior of cascaded third-order MZI's without mitigation mechanisms, it can be seen that the mean rejection ratio has shifted to approximately 60 dB and the mean absorption coefficient has shifted to approximately 1800 mdB, however these may have different values in other embodiments.

Figure 8:
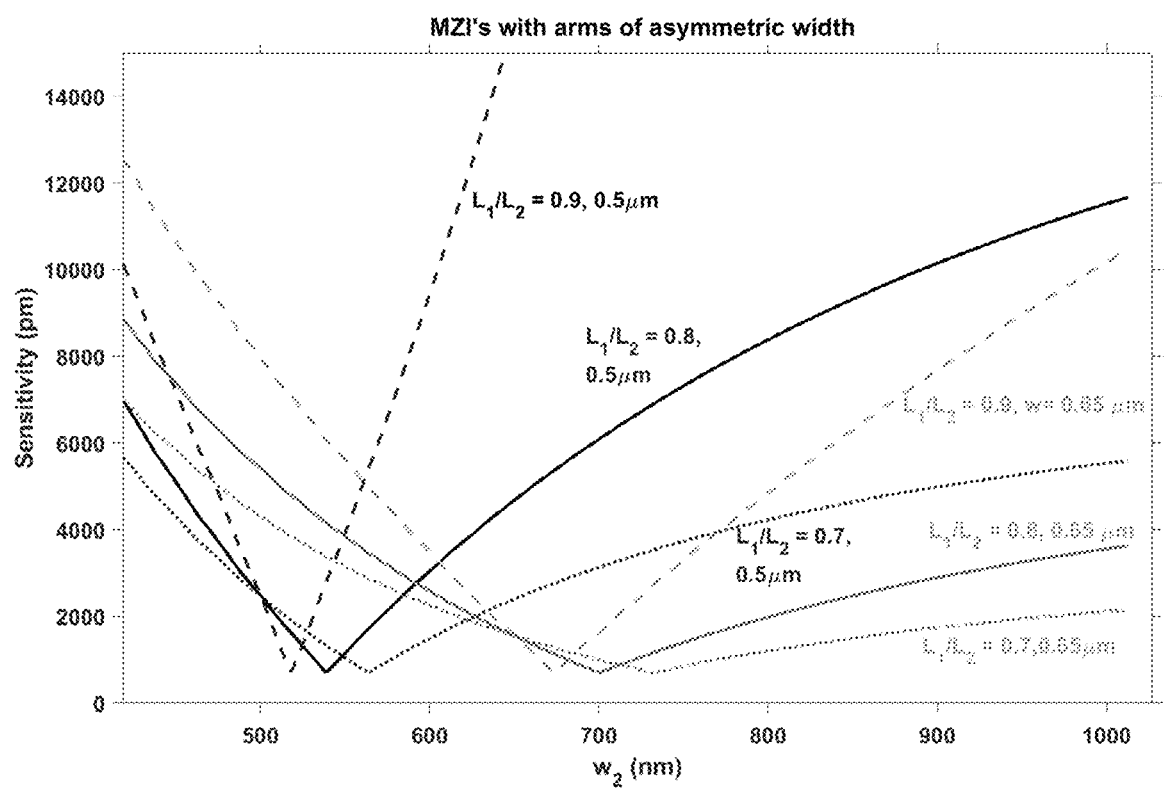
FIG. 8 illustrates designs to minimize susceptibility to fabrication errors, according to embodiments of the disclosure.

In one embodiment, a fabrication tolerant MZI design uses asymmetric widths for each MZI arm. In this particular embodiment it is desired to mitigate variations to both thickness (h) and width (w), so the quantity in Equation (10) is minimized. The results are plotted in FIG. 8 that illustrates designs to minimize susceptibility to fabrication errors. The minimization procedure yields a value of $\Delta\lambda_c \approx 700$ pm at various values of $\kappa$ for varying values of $w_1$ and h=220 nm. Incidentally, the minimization yields $\partial n_1/\partial w - \partial n_2/\partial w = 0$, while being at the mercy of $\sigma_h|\partial n_1/\partial h - \partial n_2/\partial h|$. Therefore, in some embodiments, a h should be reduced.

Figure 7:
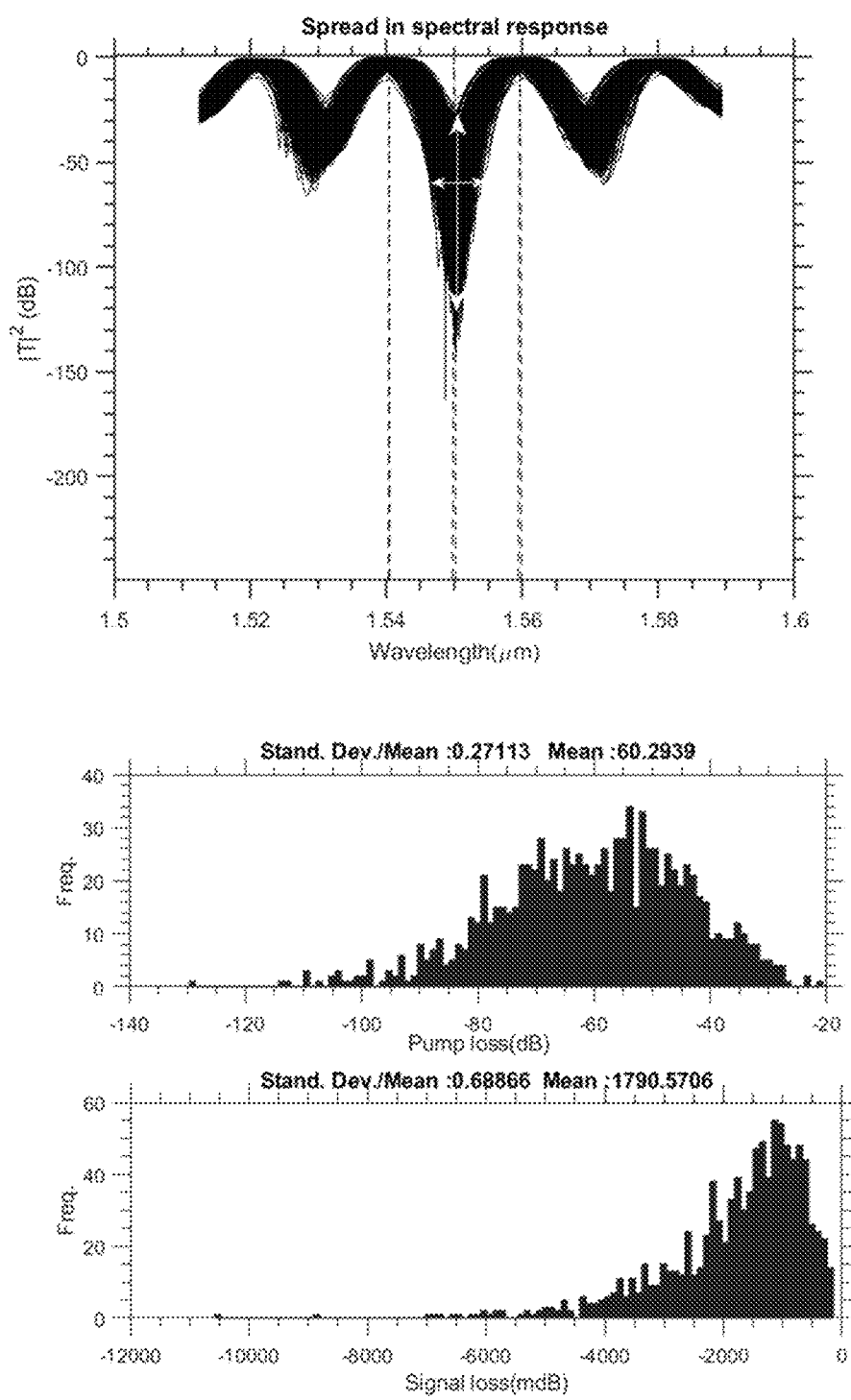
FIG. 7 illustrates the statistical behavior of four-stage cascaded third-order MZI filter without mitigation mechanisms, according to embodiments of the disclosure.
Figure 9:
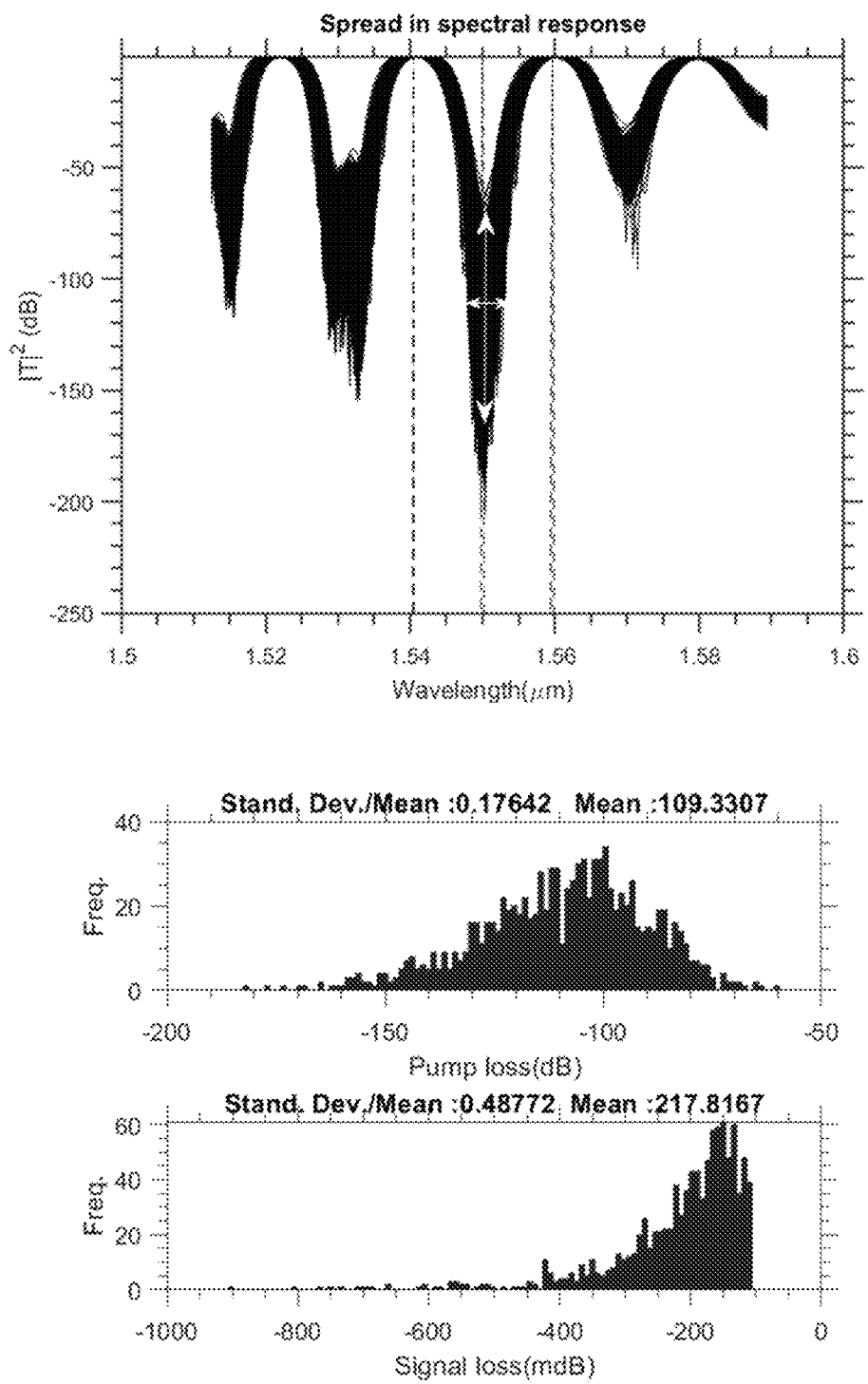
FIG. 9 illustrates the statistical distribution of cascaded third-order MZI's with asymmetric arm widths, according to embodiments of the disclosure.

As shown in FIG. 9, the statistical distribution of cascaded third-order MZI's with asymmetric widths $w_1$=500 nm and $w_2$=540 nm, h=220 nm are illustrated. In some embodiments, this value can be reduced by increasing the height of the waveguides. For instance at h=245.5 nm, $\Delta\lambda_c \approx 580$ pm. However, it also appears that using thicker waveguides in some embodiments causes the transmission loss to increase due to dispersion. Therefore, over engineering this aspect of the system may not be worthwhile for some embodiments. Using such a configuration, FIG. 9 illustrates the performance for N=4 incoherently cascaded third-order filters. An improvement in performance compared to that depicted in FIG. 7 is evident with the mean rejection ratio shifting to 110 dB and mean loss shifting to 188 mdB.

Figure 10:
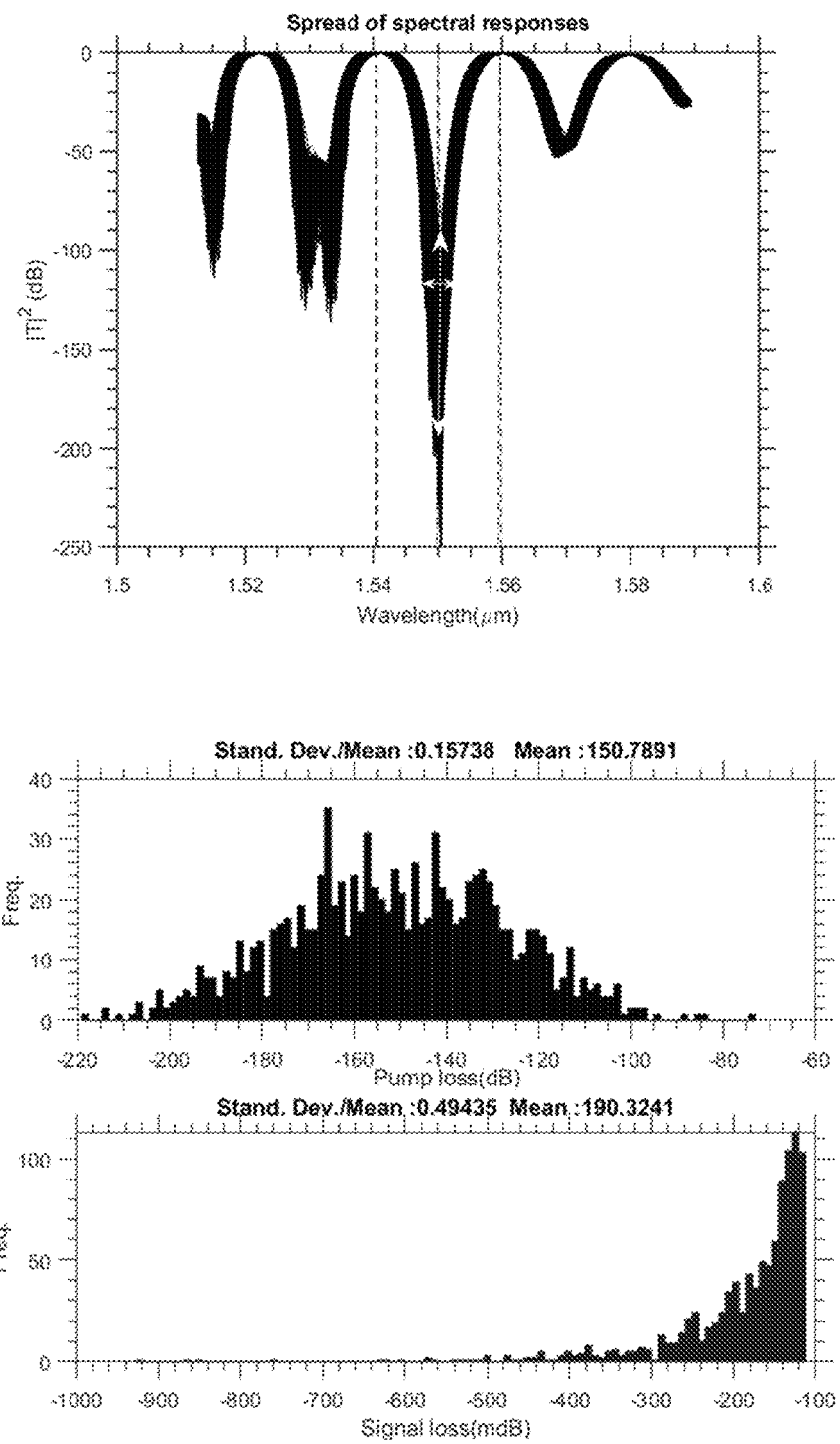
FIG. 10 illustrates the statistical distribution of cascaded third-order MZI's in the absence of coupler variations with respect to fabrication uncertainties, according to embodiments of the disclosure.

Furthermore, if coupler variations with respect to fabrication uncertainties (simply referred to as coupler variations henceforth) are ignored, then the performance is shown in FIG. 10 illustrating the statistical distribution of cascaded third-order MZI's in the absence of coupler variations with respect to fabrication uncertainties. The rejection ratio shifts to 154 dB, while the transmission loss changes to 165 mdB. In some embodiments, this can indicate that coupler variations predominantly produce vertical movements in the spectral response while the index changes produce mainly horizontal shifts. Horizontal shifts affect both rejection ratio and transmission loss, while vertical shifts predominantly affect rejection ratios.

Figure 11:
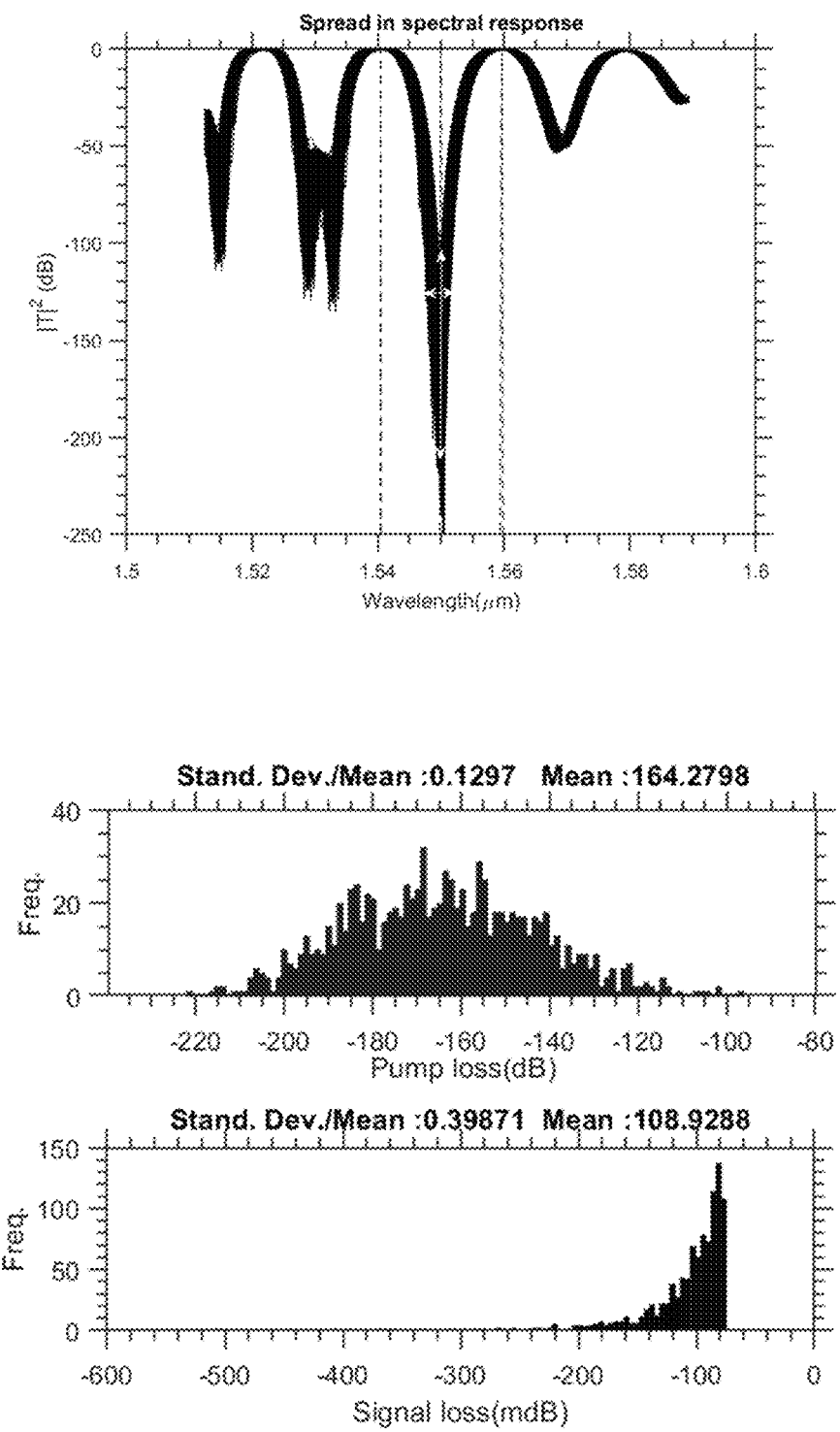
FIG. 11 illustrates the statistical distribution of MZI properties for three waveguide widths, according to embodiments of the disclosure.

In some embodiments, while using asymmetric arms can make $|\partial n_1/\partial w - \partial n_2/\partial w| = 0$, it may not correlate to a transmission minimum located at $\lambda_0$=1.55 μm. In the above embodiments, it is fortuitous that for $\kappa+\delta\kappa$, the above resonance condition is satisfied. Here, $\delta\kappa$ is a relatively small amount of adjustment imparted to $\kappa$. Therefore, there may be a residual error of $-\delta\kappa\partial n_2/\partial w$, which is may be undesirable. However, if two additional waveguide widths are used (i.e. $w_2$, $w_3$), then some embodiments may have improved results. This is demonstrated in FIG. 11, where one of the arms contains two widths of 0.5, 0.66 microns. More specifically, FIG. 11 illustrates the statistical distribution of MZI properties for three waveguide widths $L_1$=22.96 μm, m=58,$\kappa_i$=[1, 4.2805, −4.6974] and $w_i$=[0.5, 0.56, 0.66] microns. In this embodiment, the design can be constrained to satisfy a condition for transmission minimum at $\lambda_0$ (Equation (1)), FSR (Equation (3)) and insensitivity to width variations (Equation (5)).

Figure 12:
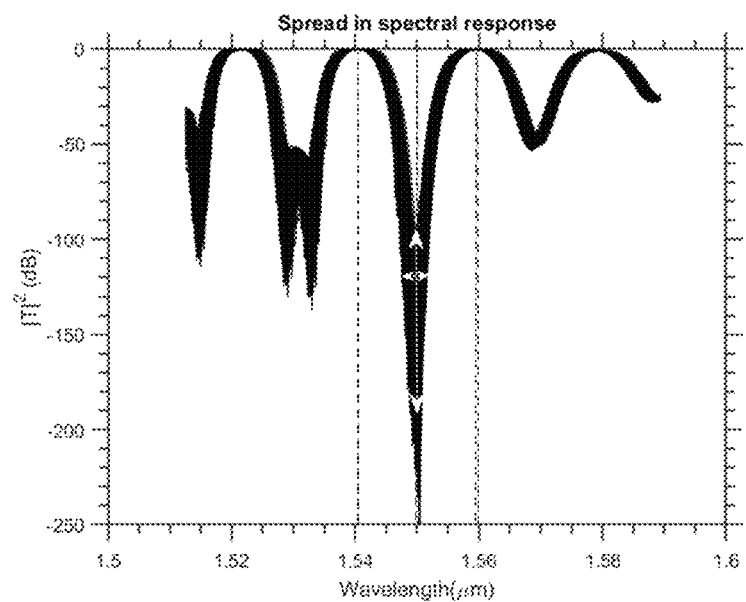
FIG. 12 illustrates the statistical distribution of an MZI filter with four waveguide widths, according to embodiments of the disclosure.
Figure 12:
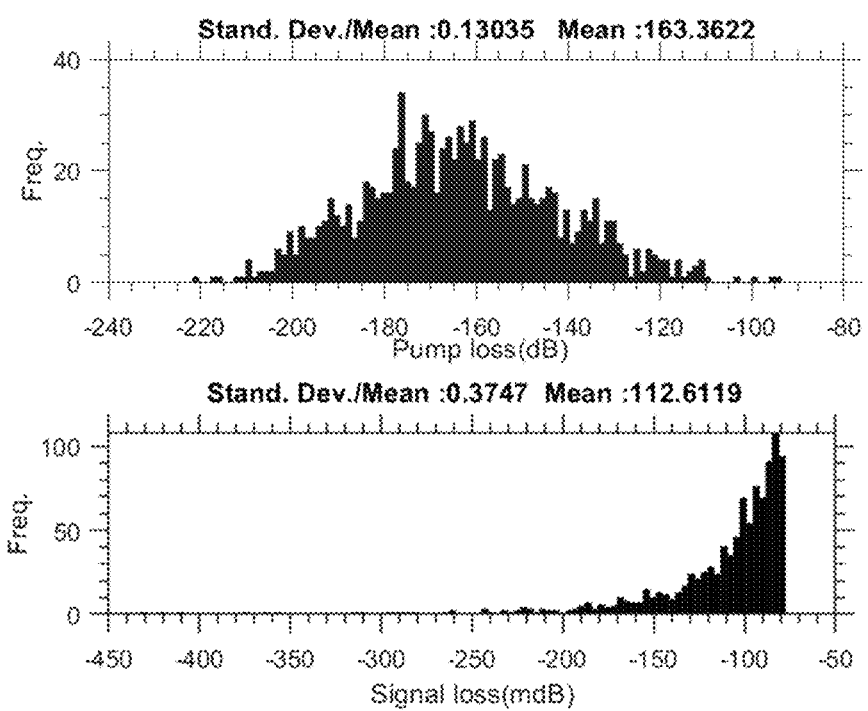

In FIG. 11, coupler variations are neglected, building on the results from FIG. 10. As can be seen, there is an additional 10 dB improvement in rejection ratio, while an improvement in transmission loss by approximately 70 mdB. While thickness variations may not be mitigated using this approach since ∂n/∂h is not a function of w, the additional constraint of having $\partial^2\varnothing\partial w\partial\omega=0$ may be included, which yields the performance in FIG. 12 showing the statistical distribution of an MZI filter with four waveguide widths. $L_1$=25.51 microns, $\kappa_i$=[1, 4.1464, −4.5875, 0.1662] and $w_i$=[0.5, 0.56, 0.66, 0.76] microns. The shape of the distribution appears to change, although improvements in mean values do not appear to occur.

In principle, compensation for perturbations in w, h can be simultaneously achieved by choosing arms with different w, h as shown in Equation (15).

$$\frac{\partial n_1}{\partial w}\bigg|_{w_1,h_1} = \frac{\partial n_2}{\partial w}\bigg|_{w_2,h_2} \quad \text{(Eq. 15)}$$

$$\frac{\partial n_1}{\partial h}\bigg|_{w_1,h_1} = \frac{\partial n_2}{\partial h}\bigg|_{w_2,h_2}$$

Figure 13:
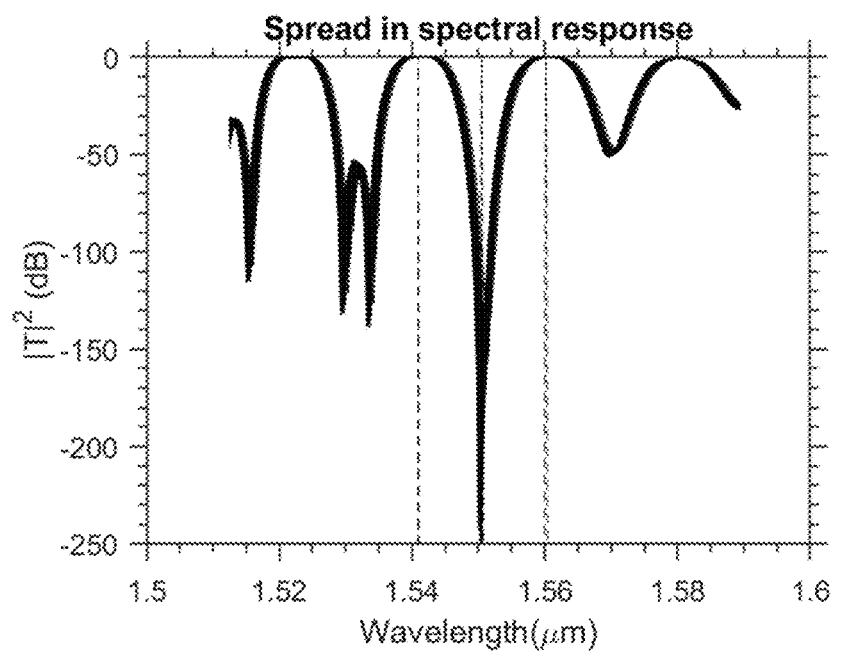
FIG. 13 illustrates fabrication tolerance achieved using asymmetric widths as well as heights, according to embodiments of the disclosure.
Figure 13:
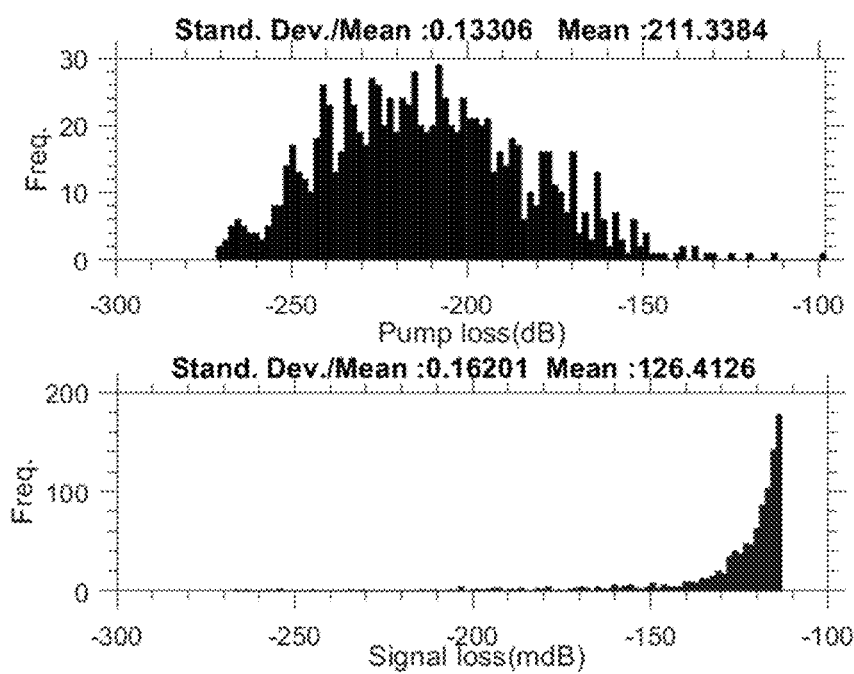

This results in a value of $\Delta\lambda_c$=26 pm. The results are plotted in FIG. 13 illustrating fabrication tolerance achieved using asymmetric widths as well as heights. $w_1$=500 nm, $w_2$=535 nm, $h_1$=220 nanometers and $h_2$=245 nanometers. The average pump rejection shifts to 174 dB and the average loss is 125 mdB, which is smaller compared to the case when only asymmetric widths without coupler variations (FIG. 10) are considered. Here, too the effect of coupler variations have been ignored. The marginal increase in absorption relative to FIGS. 11 and 12 is that the constraint of fixing A, is not satisfied. In some embodiments, waveguide geometries that effectively enable different heights (such as rib waveguides) can be used. Furthermore, some embodiments can use both different heights and multiple widths to further improve performance.

Figure 14A:
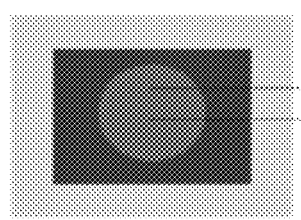
FIGS. 14A-14D illustrate unconventional cross-sections that are compatible with CMOS-foundry processes, according to embodiments of the disclosure.
Figure 14B:
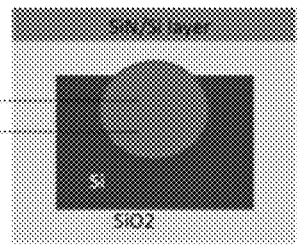
Figure 14C:
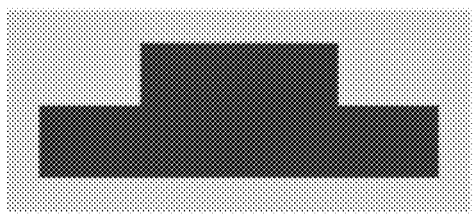
Figure 14D:
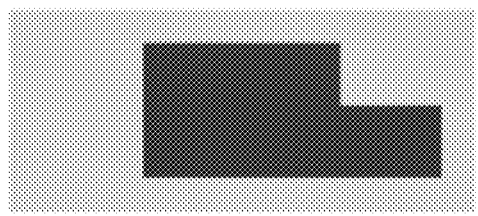

While obtaining different thicknesses can be challenging in some embodiments, there may be ways to accomplish this by using unconventional cross-sections that are compatible with current CMOS-foundry processes, as shown in FIGS. 14A-14D. In one example embodiment shown in FIG. 14A, a conventional strip waveguide is shown. In FIG. 14B, a cross-section which has an additional silicon nitride or silicon layer on top of the SOI strip waveguide that modifies the effective height is shown. FIG. 14C illustrates a rib waveguide and FIG. 14D illustrates a modified rib waveguide showing two other embodiments that offer height changes.

Figure 15:
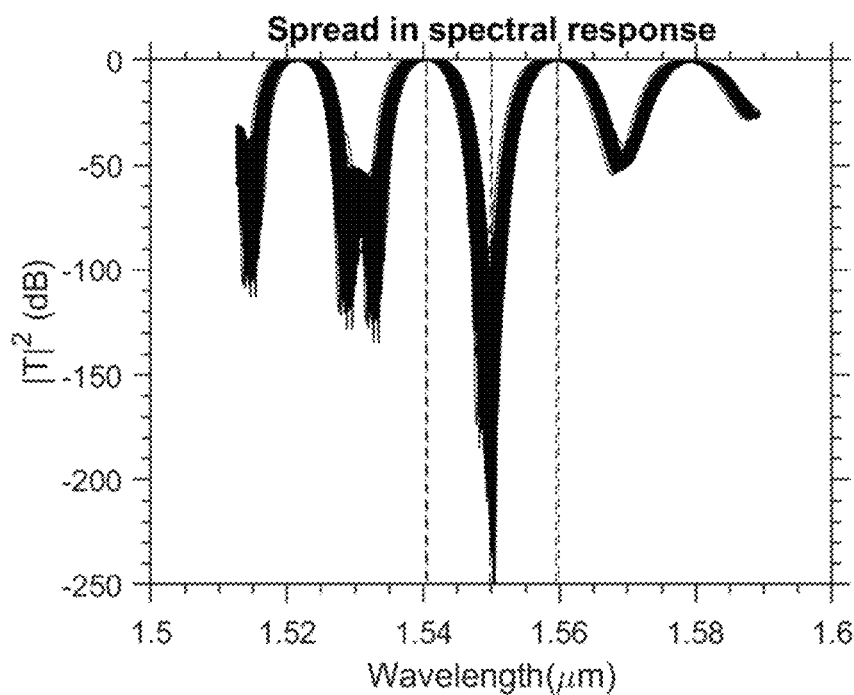
FIG. 15 illustrates the performance of a filter, according to embodiments of the disclosure.
Figure 15:
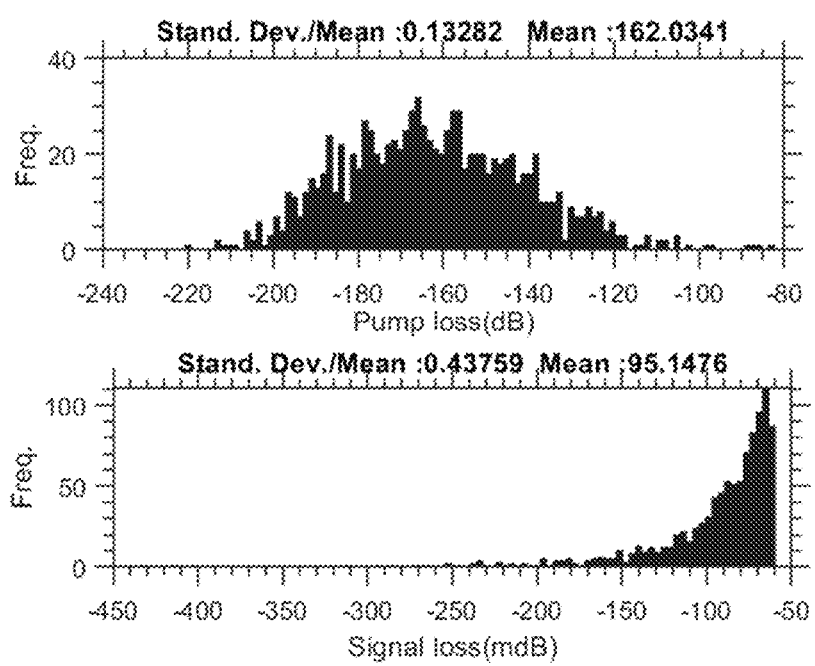

The effect of coupler dispersion and insertion loss on the system can now be considered. All the systems are assumed to possess the three-waveguide design from FIG. 11, however other embodiments may have other configurations. In the first embodiment illustrated in FIG. 15, the coupler dispersion is retained while waveguide loss is reduced to 0.1 dB/cm. FIG. 15 illustrates performance of the filter when the loss is reduced to 0.1 dB/cm and with couplers robust to fabrication variations but with varying transmission with respect to frequency.

Figure 16:
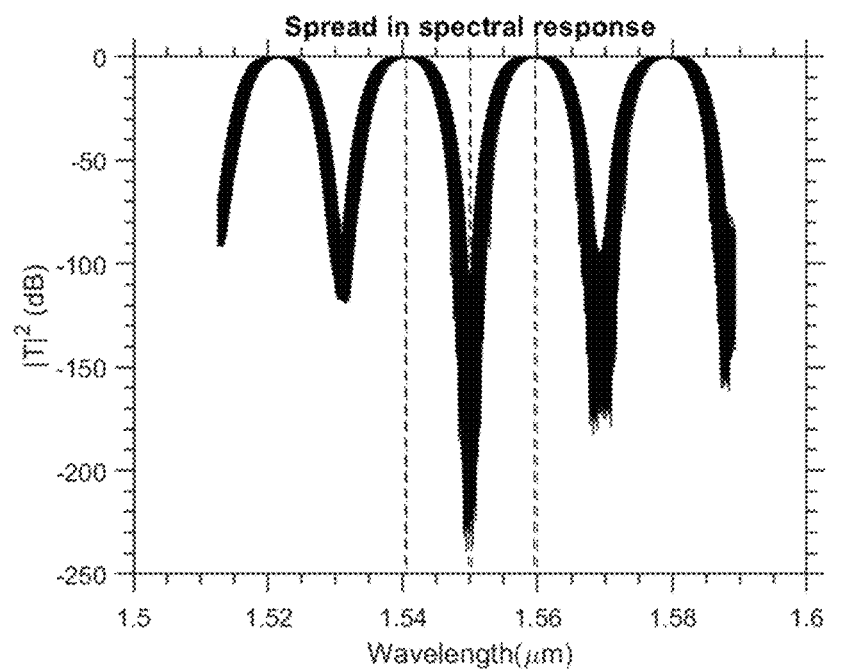
FIG. 16 illustrates performance of a filter, according to embodiments of the disclosure.
Figure 16:
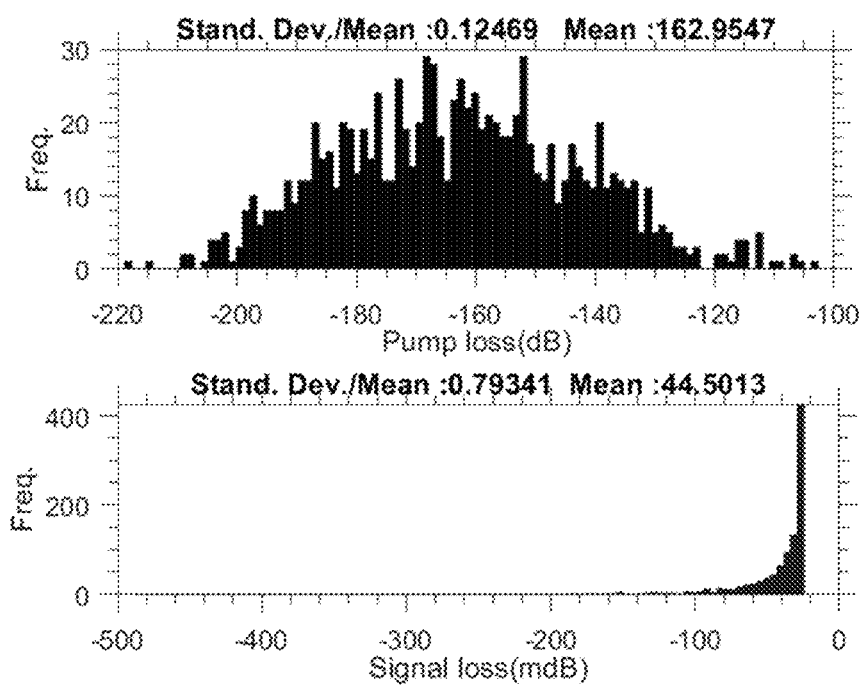

With this improvement, the transmission loss has reduced to 93 mdB, while the pump rejection has been minimally altered. On the contrary, when the loss is maintained at 0.3 dB/cm but the couplers are fab-tolerant and also not dispersive, the transmission loss falls below the 50 mdB level as shown in FIG. 16. FIG. 16 illustrates performance of the filter when the loss is 0.3 dB/cm with couplers that are robust to fabrication variations and also with constant transmission with respect to frequency.

Figure 17:
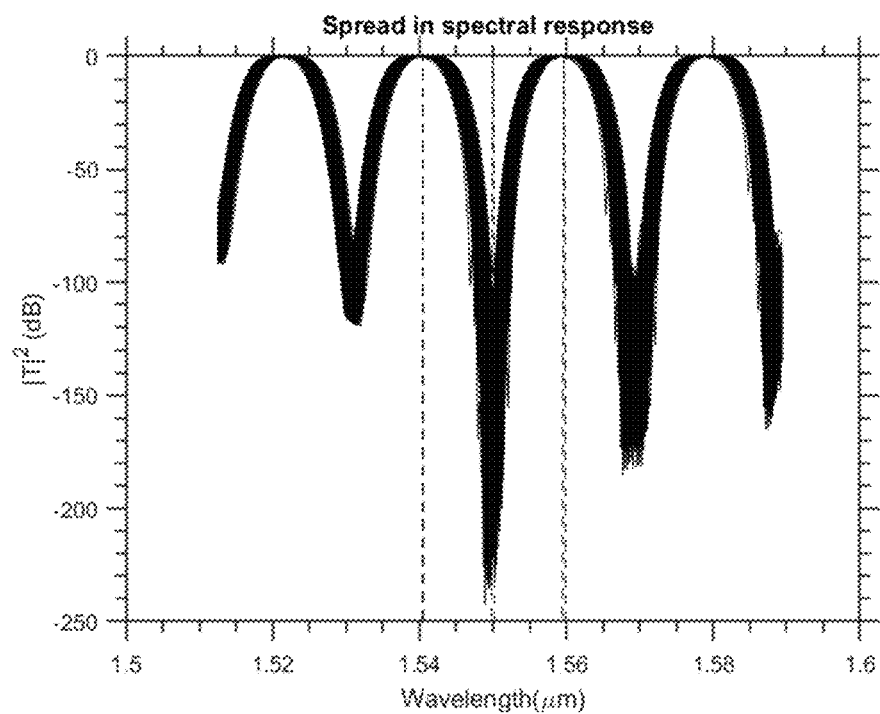
FIG. 17 illustrates performance of the filter, according to embodiments of the disclosure.
Figure 17:
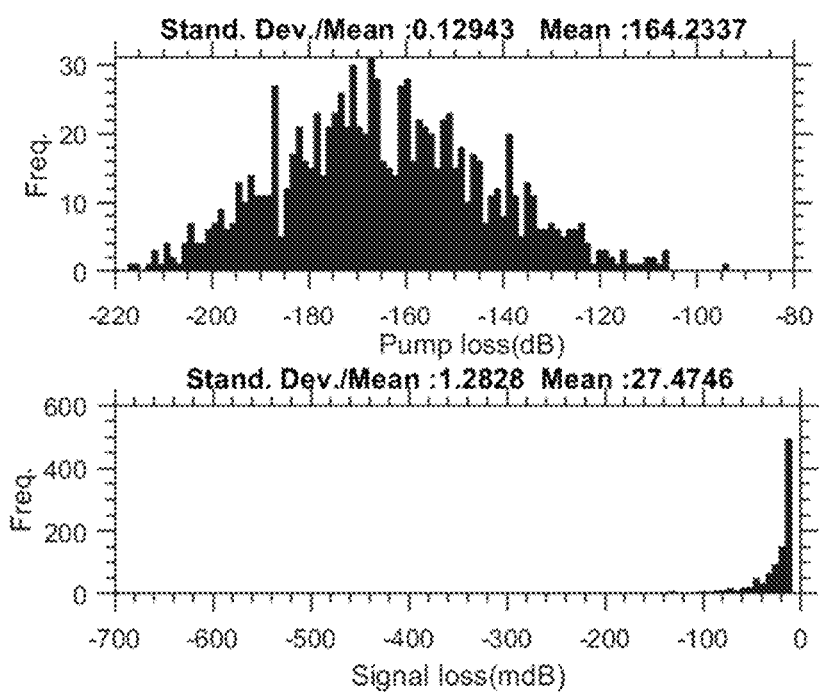

Thus, in order to meet device specifications, in some embodiments, the couplers may be fab-tolerant and broadband. When the loss is also reduced to 0.1 dB/cm with couplers robust to fabrication and also with constant transmission coefficients with respect to frequency, transmission losses reduce to 28 mdB as can be seen in FIG. 17. FIG. 17 illustrates performance of the filter when loss is reduced to 0.1 dB/cm with couplers robust to fabrication variations and also with constant transmission with respect to frequency. In order to reduce transmission loss values below 25 mdB, the number of stages may be reduced to three, although this may also reduce the mean pump rejection ratio. Therefore, in order to further improve the yield, improved process control or reduced values of $\sigma_w$, $\sigma_h$ may be needed.

Figure 18:
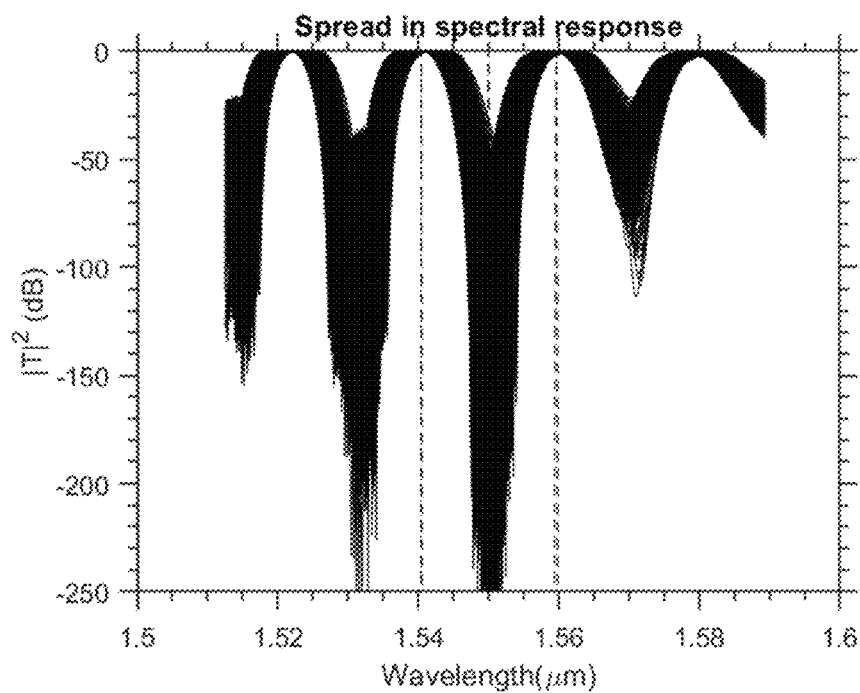
FIG. 18 illustrates asymmetric widths where width and height variations are independent, according to embodiments of the disclosure.
Figure 18:
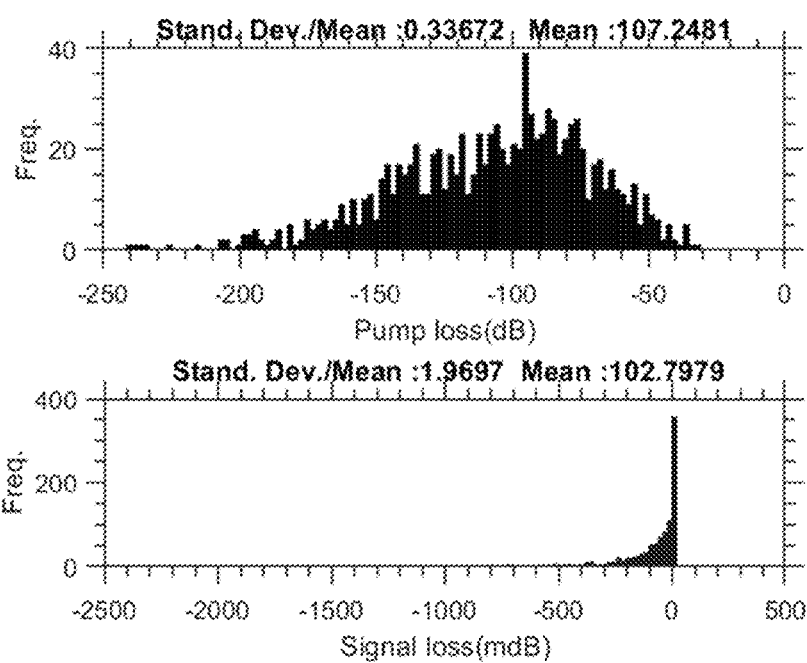

As described above, the variations of width and thickness were treated as independent random variables and each stage was assumed to vary independently. In this section the case when the width and height variations are uncorrelated but all stages are well-correlated is evaluated. When the correlation between each stage increases, the spread in performance increases as shown in FIG. 18. FIG. 18 illustrates asymmetric widths where width and height variations are independent and every stage is correlated with a loss of 0.3 dB/cm.

Figure 19:
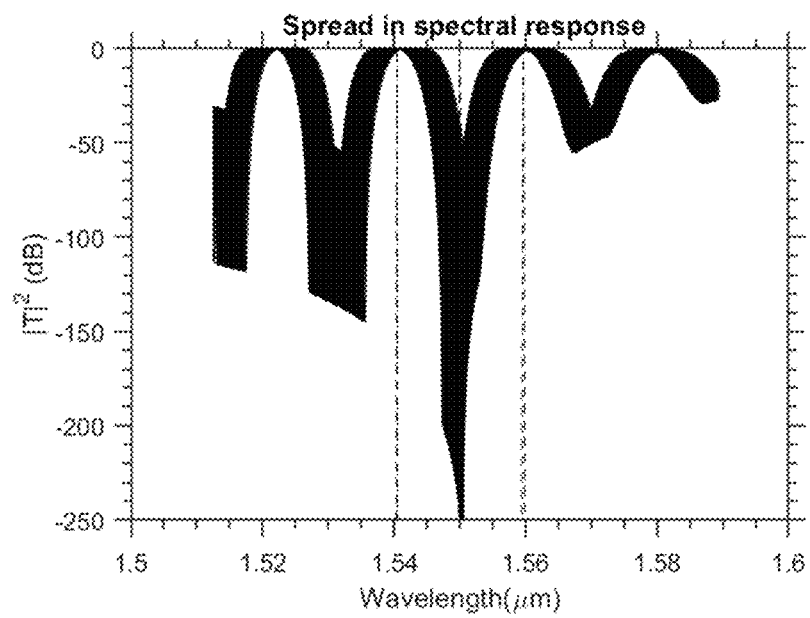
FIG. 19 illustrates a filter having asymmetric widths where width and height variations are independent and each stage is correlated, according to embodiments of the disclosure.
Figure 19:
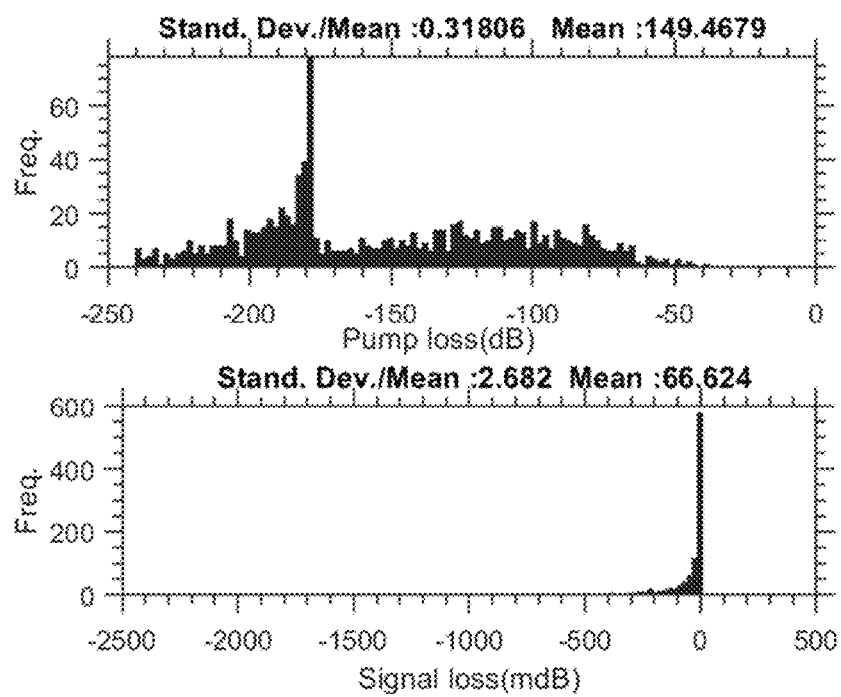
Figure 20:
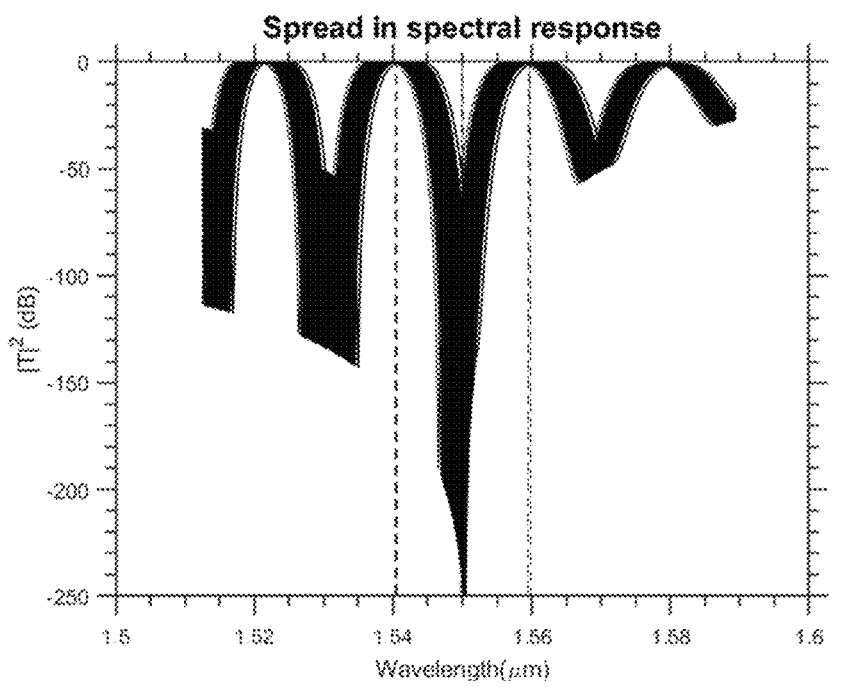
FIG. 20 illustrates an embodiment where width and height variations of every stage are correlated, according to embodiments of the disclosure.
Figure 20:
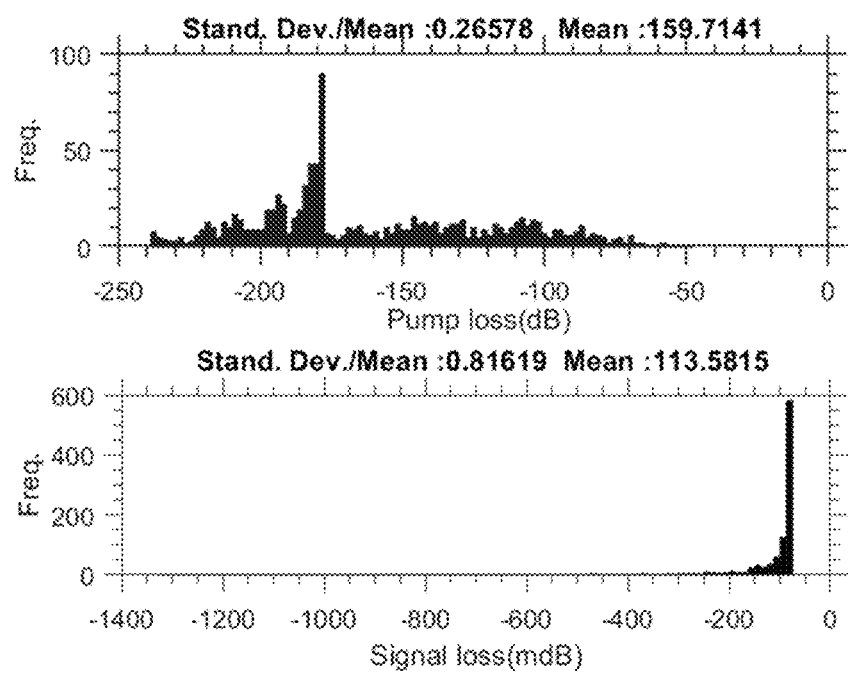

However, in some embodiments, if the couplers are made insensitive to fabrication, then the performance improves as seen in FIG. 19. FIG. 19 shows an embodiment having asymmetric widths where width and height variations are independent and each stage is correlated. Couplers are considered fabrication tolerant and the loss is 0.3 dB/cm. Using three or four waveguide widths, as was the case in FIGS. 11 and 12, improves performance even more, bringing elements close to specifications in FIG. 20. FIG. 20 illustrates an embodiment where width and height variations of every stage are correlated. In additional to mitigating coupler variations, one embodiment uses three waveguide widths. The waveguide loss assumed in this embodiment is 0.3 dB/cm.

Figure 21:
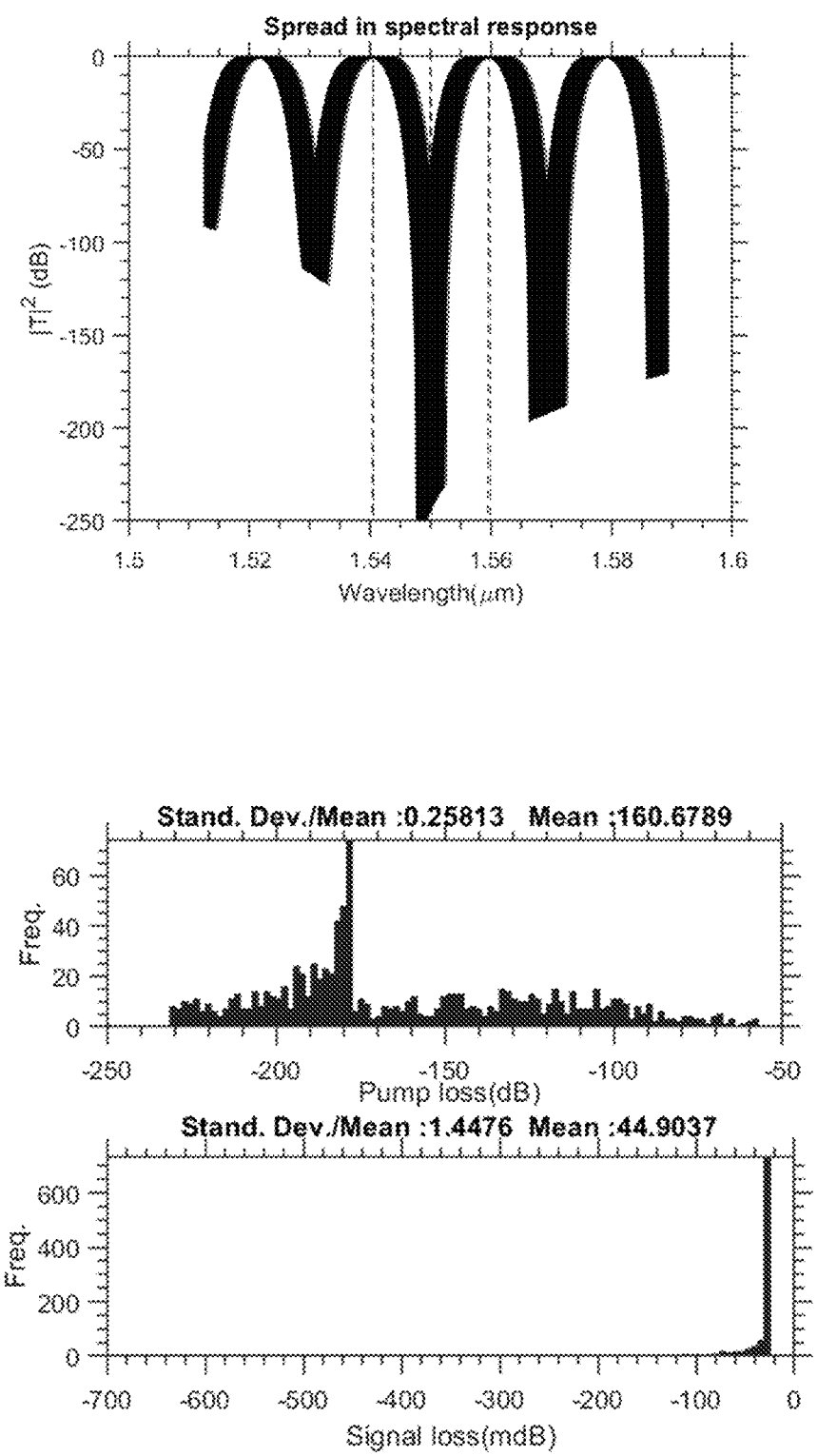
FIG. 21 illustrates an embodiment where width and height variations are independent but are correlated for all stages, according to embodiments of the disclosure.
Figure 22:
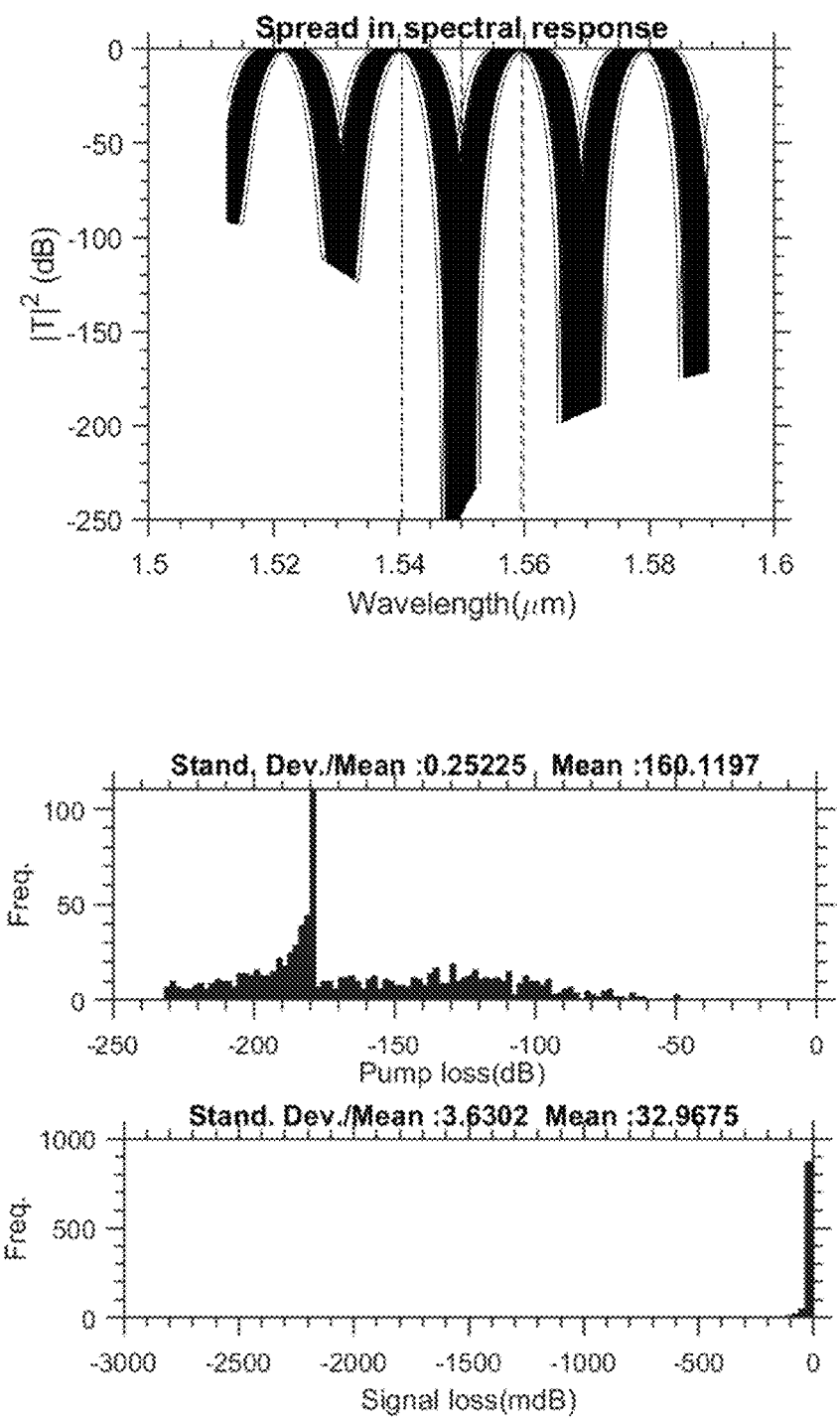
FIG. 22 illustrates an embodiment where width and height variations are independent but are correlated for all stages, according to embodiments of the disclosure.

If develop broadband couplers are developed while maintaining loss at 0.3 dB/cm, the performance improvement is line with trends in the previous embodiments, as shown in FIG. 21. FIG. 21 illustrates an embodiment where width and height variations are independent but are correlated for all stages. The structure uses three waveguide widths and fab-tolerant and broadband couplers and the insertion loss is 0.3 dB/cm. As illustrated in FIG. 22, the loss is reduced to 0.1 dB/cm, which brings the performance to similar levels as shown in FIG. 17. More specifically, even when the correlations are not favorable, the devices have comparable yield. FIG. 22 illustrates an embodiment where width and height variations are independent but are correlated for all stages. The structure uses three waveguide widths, fab-tolerant and broadband couplers as well as a reduced insertion loss of 0.1 dB/cm.

Serial improvements are summarized that can be achieved for various design improvements shown in Table 3. In some embodiments, broadband, fabrication insensitive couplers enable the system to meet performance specifications. In further embodiments, reducing waveguide losses on-chip may help improve the performance and yield. In addition embodiments having $\sigma_w$<3 nanometers and $\sigma_h$<0.5 nanometers may be used.

Table 4 summarizes different embodiments that may have reduced performance and also identifies various strategies that could potentially address the performance. Each point labelled (i)-(iv) in Table 4 is discussed in more detail below.

(i) In some embodiments, the use of asymmetric arm widths may achieve tuning-free operation of cascaded third-order filters. Use of three or four waveguide widths helps achieve pinning the transmission minimum and also compensates $\partial^2 n/\partial w \partial \omega$.

(ii) In some embodiments, the use of multi-waveguide sections can mitigate many sources of variation but due to the invariance of $\partial n/\partial h$ to w, this approach may need long device lengths to mitigate thickness variations. In principle, using different waveguide heights can also address thickness variation issues, although this may not be a CMOS-foundry compatible process. Some embodiments may use unconventional waveguide geometries to effectively engineer a height difference.

TABLE 3

| Design | Mean Pump rejection $\mu_{pump}$ (dB) | $\mu - \sigma_{pump}$ (dB) | ≥120 dB (%) | Mean Transmission loss (mdB) | $\mu_{loss} + \sigma_{loss}$ (mdB) | ≤25 mdB (%) |
|---|---|---|---|---|---|---|
| Standard third-order, 4 stage MZI, 0.3 dB/cm | 60 | 44 | 0 | 1830 | 3074 | 0 |
| Asymmetric widths, 0.3 dB/cm | 110 | 92 | 28 | 188 | 280 | 0 |
| Asymmetric widths and robust couplers, 0.3 dB/cm | 154 | 130 | 87 | 164 | 237 | 0 |
| Multiple widths, robust couplers, 0.3 dB/cm | 163 | 97.4 | 99.4 | 110 | 155.1 | 0 |
| Standard third-order, 4 stage MZI, 0.3 dB/cm | 163 | 98.2 | 99.43 | 44 | 80 | 2.2 |
| Multiple widths, robust couplers and 0.1 dB/cm loss | 163 | 143.5 | 97.1 | 93 | 144.1 | 0 |
| Multiple widths, robust and broadband couplers and 0.1 dB/cm loss | 163 | 141.5 | 97.4 | 28 | 67 | 67.3 |
| Multiple widths, robust couplers and 0.1 dB/cm loss, 3 stages | 122 | 104 | 55.1 | 22 | 56 | 76.2 |
| $\sigma_w = 1$ nm, $\sigma_h = 0.25$ nm and Multiple widths, robust, broadband couplers, 0.1 dB/cm, 4 stages | 188 | 175 | 100 | 10.5 | 12.5 | 99.7 |
| $\sigma_w = 1$ nm, $\sigma_h = 0.25$ nm and Multiple widths, robust, broadband couplers, 0.1 dB/cm, 3 stages | 141 | 131 | 98.5 | 7.8 | 8.8 | 100 |
| Asymmetric widths, correlated stage variations, 0.3 dB/cm | 111 | 73.26 | 36 | 210 | 609 | 0 |
| Asymmetric widths, robust couplers and correlated stage variations, 0.3 dB/cm | 148 | 102 | 69 | 178 | 329.3 | 0 |
| Multiple widths, robust couplers and correlated stage variations, 0.3 dB/cm | 164 | 123 | 78 | 105 | 177 | 0 |
| Multiple widths, robust and broadband couplers and correlated stage variations, 0.3 dB/cm | 163 | 120.75 | 80 | 44 | 103 | 21 |
| Multiple widths, robust and broadband couplers and correlated stage variations, 0.1 dB/cm | 163 | 120 | 78 | 28 | 95 | 79 |
| $\sigma_w = 1$ nm, $\sigma_h = 0.25$ nm and Multiple widths, robust, broadband couplers, 0.1 dB/cm, correlated | 187 | 163 | 99.2 | 10.5 | 13.85 | 99.4 |
| $\sigma_w = 1$ nm, $\sigma_h = 0.25$ nm and Multiple widths, robust, broadband couplers, 0.1 dB/cm, 3 stages | 141 | 124 | 91 | 7.8 | 10.38 | 99.6 |

TABLE 4

| Problem | Reason | Value | Strategy |
|---|---|---|---|
| (i) Resonance shift | | | Multiple waveguide widths |
| (ii) Sensitivity to height | Equal heights | | Si—SiO$_2$—Si, Si—SiN—Si waveguides |
| (iii) Transmission loss | Dispersion in couplers | 62 mdB | Broadband couplers |
| (iv) Bandwidth of filter | Roll-off | 2 nm at −150 dB | Reduced waveguide loss Additional stages or alternate architectures |

Figure 23:
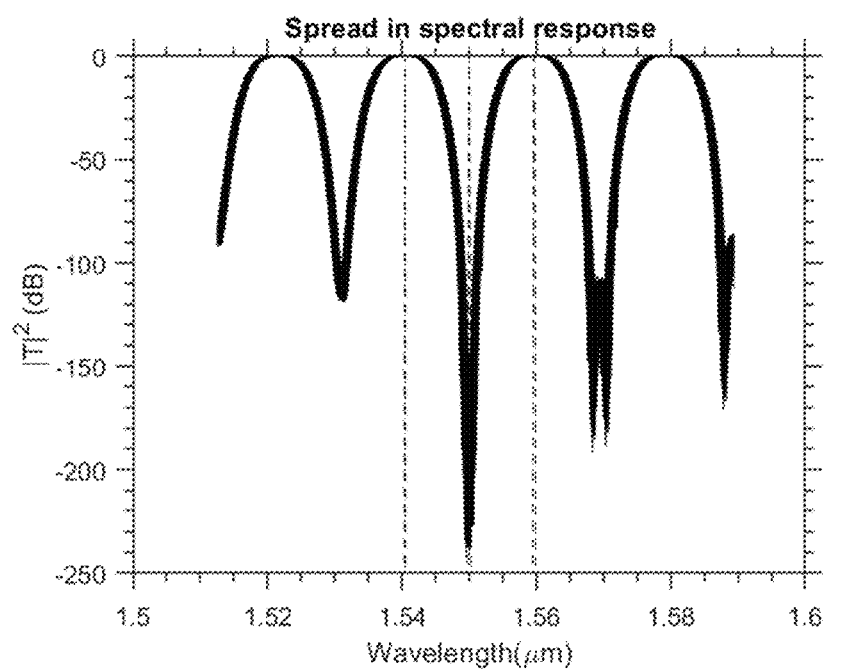
FIG. 23 illustrates the performance of a filter, according to embodiments of the disclosure.
Figure 23:
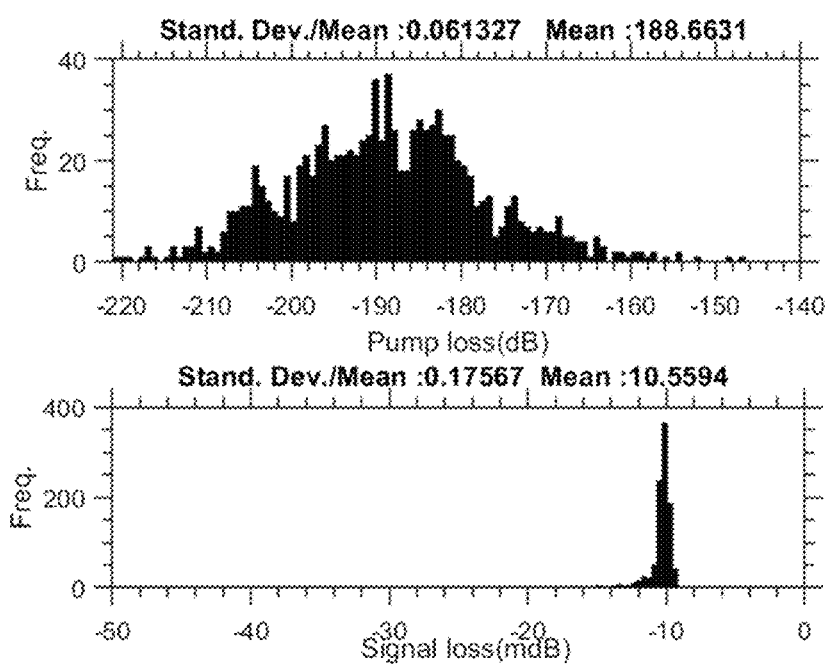

As shown in FIG. 23, in some embodiments, reducing $\sigma_w$ to 1 nanometer and $\sigma_h$ to 0.25 nanometer from 3 and 0.5 nanometer respectively enables the specifications to comfortably meet the goals.

(iii) In some embodiments, the role of coupler dispersion and variations with fabrication may be important. Designing couplers that are more broadband and insensitive to fabrication variations may be needed to make a filter robust to perturbations.

(iv) In some embodiments, to meet specifications, loss may reach approximately 0.1 dB/cm. This may enable specifications to be exceeded by adding further cascaded third-order MZI filter stages. In further embodiments, using three stages may meet rejection ratio targets while keeping losses below the 25 mdB level.

(v) In some embodiments, further improvement of fabrication tolerances to $\sigma_w \ll 3$ nm and $\sigma_h \ll 0.5$ nanometer may improve the mean pump rejection to 188 dB and average loss to 10.54 mdB for a four stage cascaded third-order MZI as is seen in FIGS. 23A and 23B.

Figure 24:
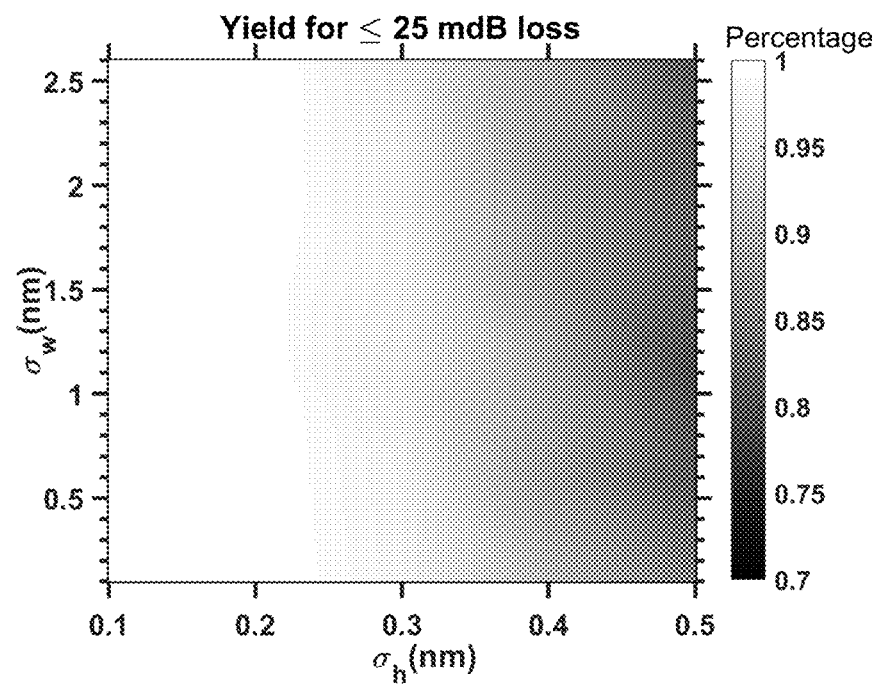
FIG. 24 illustrates yield percentage, according to embodiments of the disclosure.
Figure 24:
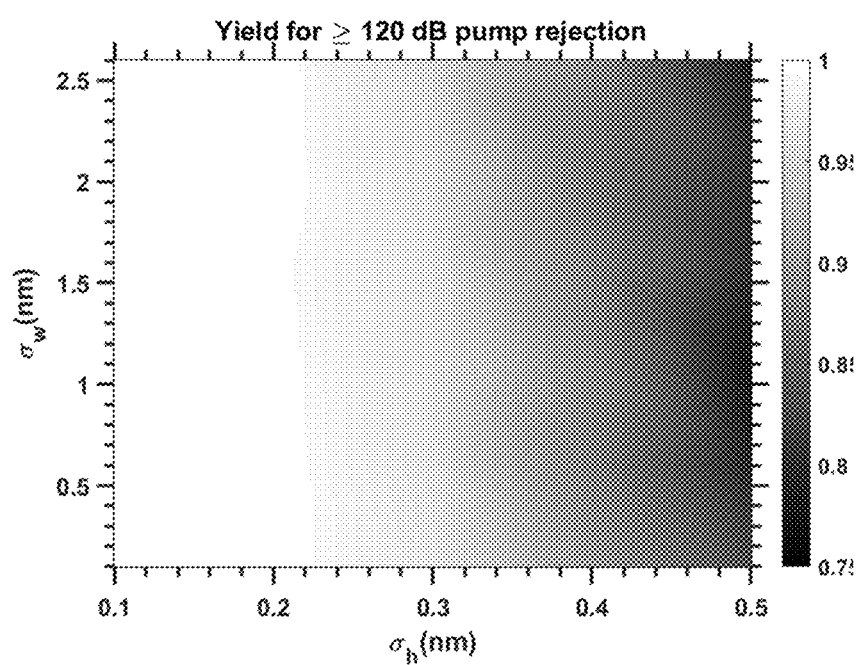

FIG. 24 illustrates yield percentage of loss ≤25 mdB and rejection ratio ≥120 db. Variations are correlated, with insertion loss of 0.1 dB/cm, broadband and fab-tolerant couplers and multiple waveguide width arms.

Although MZI filter 100 (see FIG. 1) is described and illustrated as one particular type of MZI-based photonic device, a person of skill in the art with the benefit of this disclosure will appreciate that compensation structures as described above are suitable for use with myriad other MZI-based photonic devices. For example, in some embodiments the MZI passive compensation structures disclosed herein can be implemented in MZI-based photonic switching devices, as described in more detail below.

Figure 25:
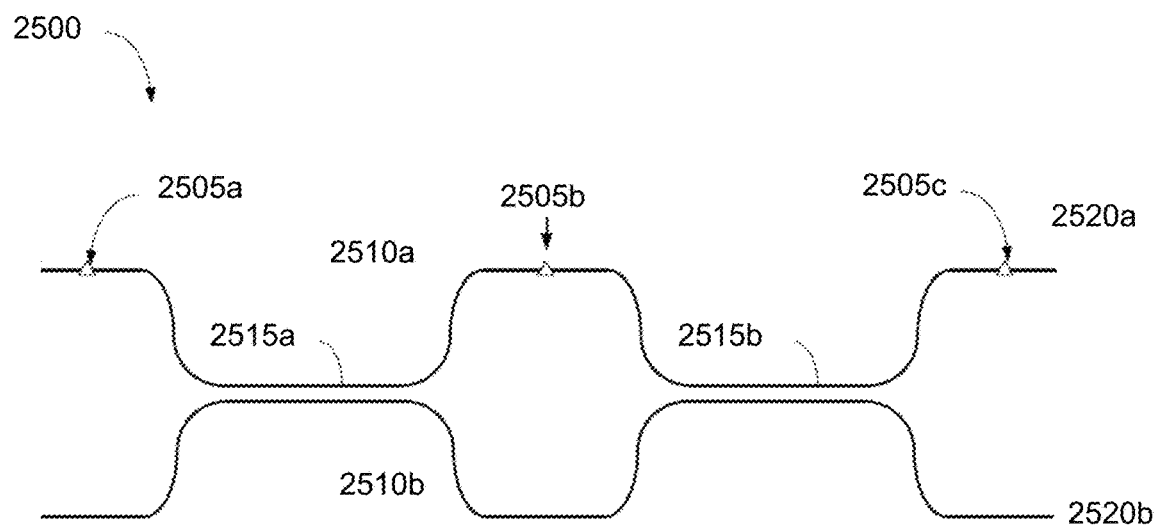
FIG. 25 illustrates a simplified plan view of an example Mach-Zehnder interferometer switch including a passive compensation structure, according to embodiments of the disclosure.
Figure 26:
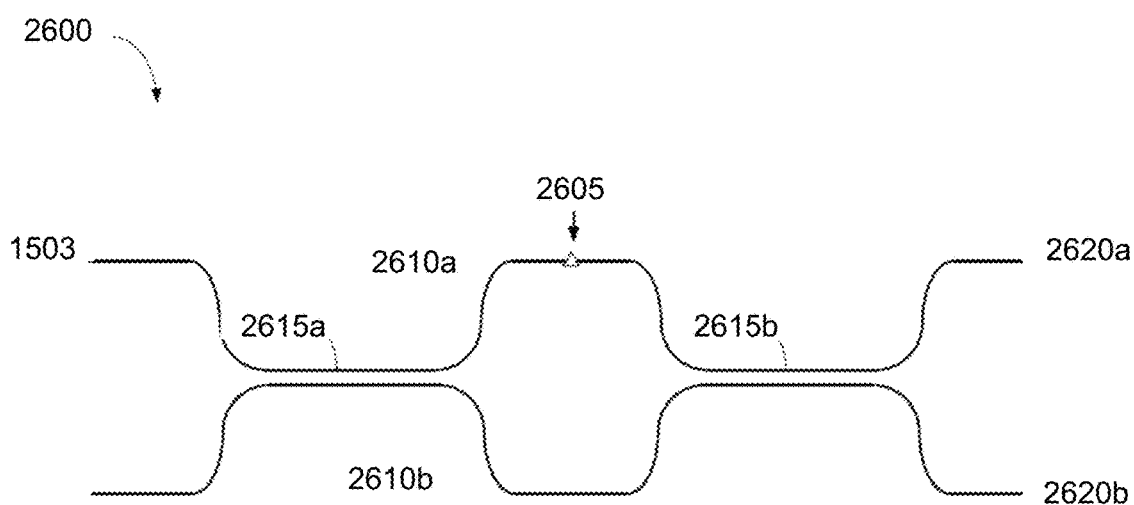
FIG. 26 illustrates a simplified plan view of an example Mach-Zehnder interferometer switch including a passive compensation structure, according to embodiments of the disclosure.

FIGS. 25 and 26 show example MZI-based photonic switches 2500 and 2600, respectively, that include one or more variable phase-shifters and can also include one or more compensation structures. Photonic switches 2500 and 2600 are similar to MZI filter 100 (see FIG. 1), each having two parallel waveguides (2510*a*, 2510*b* in FIG. 25, and 2610*a* and 2610*b* in FIG. 26), however photonic switches 2500 and 2600 each include one or more phase shifters (2505*a*, 2505*b*, 2505*c* in FIGS. 25 and 2605 in FIG. 26) disposed in one or more waveguides of each photonic switch. Phase-shifters (2505*a*, 2505*b*, 2505*c* in FIGS. 25 and 2605 in FIG. 26) can be implemented a number of ways in integrated photonic circuits and can provide control over the relative phases imparted to the optical field in each waveguide. In some embodiments, variable phase-shifters can be implemented using thermo-optical switches.

In some embodiments thermo-optical switches can use resistive elements fabricated on a surface of the photonic device. Employing the thermo-optical effect in these devices can provide a change of the refractive index n by raising the temperature of the waveguide by an amount of the order of $10^{-5}$ K. One of skill in the art having had the benefit of this disclosure will understand that any effect that changes the refractive index of a portion of the waveguide can be used to generate a variable, electrically tunable, phase shift. For example, some embodiments can use beam splitters based on any material that supports an electro-optic effect. In some embodiments so-called $\chi^{(2)}$ and $\chi^{(3)}$ materials can be used such as, for example, lithium niobate, BBO, KTP, BTO, and the like and even doped semiconductors such as silicon, germanium, and the like.

In some embodiments, switches with variable transmissivity and arbitrary phase relationships between output ports can also be achieved by combining directional couplings (e.g., directional couplings 2515*a*, 2515*b* in FIGS. 25 and 2615*a*, 2615*b* in FIG. 26), and one or more variable phase-shifters (e.g., phase-shifters 2505*a*, 2505*b*, 2505*c* in FIGS. 25 and 2605 in FIG. 26) within each photonic switch. Accordingly, complete (e.g., analog or digital) control over the relative phase and amplitude of the two output ports can be achieved by varying the phases imparted by phase shifters (2505*a*, 2505*b*, 2505*c* in FIGS. 25 and 2605 in FIG. 26). FIG. 26 illustrates a slightly simpler example of a MZI-based photonic switch that allows for variable transmissivity between ports 2620*a* and 2620*b* by varying a phase imparted by phase shifter 2605.

In some embodiments one or more compensation structures can be implemented within MZI-based photonic switches 2500,2600 using compensation equations similar to those described above with regard to MZI filter 100 (see FIG. 1). More specifically, the compensation equations can be used to determine a width and a length of each compensation portion that can be used to reduce a shift in frequency response caused by various perturbations, including variations in manufacturing widths of the waveguides, manufacturing variations in thicknesses of the waveguides and variations in temperature. Similar to the compensation structures described for MZI filter 100 (see FIG. 1), compensation structures can be employed in one or more waveguides (2510*a*, 2510*b* in FIGS. 25, and 2610*a* and 2610*b* in FIG. 26), and each compensation structure can each have a quantity of waveguide widths that is greater than the number of perturbations, however the governing equations may be different for an MZI-based photonic switch embodiment, as described in more detail below.

The phase relationship in an MZI-based photonic switch embodiment may be described as follows. The first two terms can be the same as MZI filter 100 (see FIG. 1), however a third term corresponding to a sum of various index changes, $\Delta n_j$, weighted by various overlap integrals $\Gamma_j$, can be added, as described by Equations (16) and (17).

$$\frac{(2m-1)\lambda_0}{2} = n_1(\omega_0)L_1 - \Sigma_i \kappa_i L_1 n_i(\omega_0) + \Sigma_j \Gamma_j(\omega_0)\Delta n_j(\omega_0)L_1 \quad \text{(Eq. 16)}$$

$$v_{FSR} = \frac{c}{L_1(n_{g1} - \Sigma_i n_{gi}\kappa_i)} \quad \text{(Eq. 17)}$$

The corresponding compensation equation for the case of an MZI-based photonic switch which requires invariance to width can be described by Equation (18).

$$\frac{\partial \phi_j}{\partial w} = L_1 \left( \frac{\partial n_1}{\partial w} - \frac{\Sigma_i \kappa_i \partial n_i}{\partial w} + \frac{\Sigma_j \partial \Gamma_j}{\partial w} \Delta n_j \right) = 0 \quad \text{(Eq. 18)}$$

Equation (18) can be reduced to Equation (19).

$$\frac{\Sigma_i \kappa_i \partial n_i}{\partial w} = \Sigma_j \frac{\partial \Gamma_j}{\partial w} \Delta n_j + \frac{\partial n_1}{\partial w} \quad \text{(Eq. 19)}$$

In some embodiments, Equations (20) through (22) can be used to account for compensation of higher-order derivatives.

$$\frac{\Sigma_i \kappa_i \partial^2 n_i}{\partial w \partial \omega} = \Sigma_j \frac{\partial}{\partial \omega}\left[\frac{\partial \Gamma_j}{\partial w}\Delta n_j\right] + \frac{\partial^2 n_i}{\partial w \partial \omega} \quad \text{(Eq. 20)}$$

$$\frac{\Sigma_i \kappa_i \partial^2 n_i}{\partial w^2} = \Sigma_j \left[\frac{\partial^2 \Gamma_j}{\partial w^2}\Delta n_j\right] + \frac{\partial^2 n_1}{\partial w^2} \quad \text{(Eq. 21)}$$

$$\frac{(n_1(\omega_0) - \Sigma_i n_i(\omega_0)\kappa_i + \Sigma_j \Gamma_j(\omega_0)\Delta n_j(\omega_0))}{(n_{g1} - \Sigma_i n_{gi}\kappa_i)} = \gamma = \frac{\left(m+\frac{1}{2}\right)\lambda_0}{c/FSR} \quad \text{(Eq. 22)}$$

Generalizing to arbitrary perturbations $X_k$, the set of compensation equations for MX=B can be described by Equations (23) through (25).

$$M = \begin{bmatrix} \gamma n_{g2} - n_2 & \gamma n_{g3} - n_3 & \cdots & \gamma n_{g(N+2)} - n_{N+2} \\ \frac{\partial n_2}{\partial X_1} & \frac{\partial n_3}{\partial X_1} & \cdots & \frac{\partial n_{N+2}}{\partial X_1} \\ \vdots & \vdots & \cdots & \vdots \\ \frac{\partial n_2}{\partial X_K} & \frac{\partial n_3}{\partial X_K} & \cdots & \frac{\partial n_{N+2}}{\partial X_K} \\ \frac{\partial n_2}{\partial \omega \partial X_1} & \frac{\partial n_3}{\partial \omega \partial X_1} & \cdots & \frac{\partial n_{N+2}}{\partial \omega \partial X_1} \\ \vdots & \vdots & \cdots & \vdots \\ \frac{\partial n_2}{\partial \omega \partial X_K} & \frac{\partial n_3}{\partial \omega \partial X_K} & \cdots & \frac{\partial n_{N+2}}{\partial \omega \partial X_K} \end{bmatrix} \quad \text{(Eq. 23)}$$

-continued $$X = \begin{bmatrix} \kappa_2 \\ \kappa_3 \\ \vdots \\ \kappa_{N+2} \end{bmatrix} \quad \text{(Eq. 24)}$$

$$B = \begin{bmatrix} \gamma n_{g1} - n_1 - \Sigma_j \Gamma_j(\omega_0)\Delta n_j(\omega_0) \\ \frac{\partial n_1}{\partial X_1} + \Sigma_j \frac{\partial \Gamma_j}{\partial X_1}\Delta n_j \\ \vdots \\ \frac{\partial n_1}{\partial X_K} + \Sigma_j \frac{\partial \Gamma_j}{\partial X_k}\Delta n_j \\ \vdots \\ \frac{\partial^2 n_1}{\partial X_K} + \frac{\partial}{\partial \omega}\Sigma_j \frac{\partial \Gamma_j}{\partial X_k}\Delta n_j \\ \vdots \\ \frac{\partial^2 n_1}{\partial X_K^2} + \Sigma_j \frac{\partial^2 \Gamma_j}{\partial X_k^2}\Delta n_j \end{bmatrix} \quad \text{(Eq. 25)}$$

Photonic switches 2500 and 2600 illustrated in FIGS. 25 and 26, respectively, and the associated compensation equations are two examples of how compensation structures can be implemented in myriad MZI-based photonic devices. One of skill in the art with the benefit of this disclosure can appreciate that similar compensation structures can be implemented in other MZI-based photonic devices.

For simplicity, various components, such as the optical pump circuitry, substrates, cladding, and other components of MZI filter 100 (see FIG. 1) are not shown in the figures. In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

What is claimed is:

1. An optical filter comprising:
a first waveguide extending between a first coupler section and a second coupler section, wherein the first waveguide comprises a plurality of buffer sections and a plurality of first taper sections, each first taper section of the plurality of first taper sections being disposed between a set of buffer sections of the plurality of buffer sections; and
a second waveguide extending between the first coupler section and the second coupler section and including a plurality of compensation sections and a plurality of second taper sections, each second taper section of the plurality of second taper sections being disposed between a set of compensation sections of the plurality of compensation sections.

2. The optical filter of claim 1 wherein a width of each of the plurality of buffer sections increases as a function of distance from the first coupler section.

3. The optical filter of claim 1 wherein a width of each of the plurality of compensation sections increases as a function of distance from the first coupler section.

4. The optical filter of claim 1 wherein the first waveguide further comprises a second plurality of buffer sections and a second plurality of first taper sections, each first taper section of the second plurality of first taper sections being disposed between a set of buffer sections of the second plurality of buffer sections.

5. The optical filter of claim 4 wherein a width of each of the second plurality of buffer sections decreases as a function of distance from the second coupler section.

6. The optical filter of claim 4 wherein:
widths of an initial buffer section of the plurality of buffer sections and a final buffer section of the second plurality of buffer sections are equal; and
lengths of the initial buffer section of the plurality of buffer sections and the final buffer section of the second plurality of buffer sections are equal.

7. The optical filter of claim 1 wherein the second waveguide further comprises a second plurality of compensation sections and a second plurality of second taper sections, each second taper section of the second plurality of second taper sections being disposed between a set of compensation sections of the second plurality of compensation sections.

8. The optical filter of claim 7 wherein a width of each of the second plurality of compensation sections decreases as a function of distance from the second coupler section.

9. The optical filter of claim 7 wherein:
widths of an initial compensation section of the plurality of compensation sections and a final compensation section of the second plurality of compensation sections are equal; and
lengths of the initial compensation section of the plurality of compensation sections and the final compensation section of the second plurality of compensation sections are equal.

10. The optical filter of claim 1 wherein:
the plurality of buffer sections comprises a first buffer section and a second buffer section joined by a first buffering taper section of the plurality of first taper sections;
the plurality of compensation sections comprises a first compensation section and a second compensation section joined by a first compensating taper section; and
a first width of the first buffer section and the first compensation section are equal and a second width of the second buffer section and the second compensation section are equal.

11. The optical filter of claim 10 wherein a length of the first buffering taper section and the first compensating taper section are equal.

12. The optical filter of claim 10 wherein:
the plurality of buffer sections comprises a first buffer section and a second buffer section joined by a first buffering taper section of the plurality of first taper sections;

the plurality of compensation sections comprises a first compensation section and a second compensation section joined by a first compensating taper section; and a first width of the first buffer section and the first compensation section are equal and a second width of the second buffer section and the second compensation section are equal.

13. The optical filter of claim 12 wherein a length of the first buffer section is equal to $\delta L_1$ and a length of the first compensation section is equal to $L_1 + \delta L_1$.

14. The optical filter of claim 12 wherein a length of the second buffer section is equal to $\delta L_2$ and a length of the second compensation section is equal to $L_2 + \delta L_2$.

15. The optical filter of claim 12 wherein lengths of the first buffering taper section and the first compensating taper section are equal.

16. The optical filter of claim 1 wherein the first coupler section, the second coupler section, the first waveguide, and the second waveguide comprise a Mach-Zehnder interferometer (MZI) filter.

17. The optical filter of claim 1 wherein lengths of the first waveguide and the second waveguide are equal.

18. The optical filter of claim 1 further comprising at least one variable phase-shifter disposed in at least one of the first waveguide or the second waveguide.

19. The optical filter of claim 18 wherein the at least one variable phase-shifter is at least one thermo-optical switch.

20. The optical filter of claim 18 wherein the at least one variable phase-shifter is characterized by a refractive index that changes as a temperature of at least one of the first waveguide or the second waveguide rises.

\* \* \* \* \*